(12) United States Patent
Staudt et al.

(10) Patent No.: US 12,032,394 B2
(45) Date of Patent: Jul. 9, 2024

(54) VALVE ASSEMBLY HAVING FLOW STREAMLINING ELEMENTS TO PREVENT OSCILLATING FLOW EFFECTS

(71) Applicant: Illinois Tool Works Inc., Glenview, IL (US)

(72) Inventors: Andrew J. Staudt, Langhorne, PA (US); Bradley G. Carman, Jamaica Plain, MA (US); Mana Mokhtabad Amrei, Norwood, MA (US); Anthony B. Kehoe, Yardley, PA (US)

(73) Assignee: Illinois Tool Works Inc., Glenview, IL (US)

( * ) Notice: Subject to any disclaimer, the term of this patent is extended or adjusted under 35 U.S.C. 154(b) by 562 days.

(21) Appl. No.: 16/719,772

(22) Filed: Dec. 18, 2019

(65) Prior Publication Data

US 2020/0201364 A1 Jun. 25, 2020

Related U.S. Application Data

(60) Provisional application No. 62/784,197, filed on Dec. 21, 2018.

(51) Int. Cl.
   *G05D 7/06* (2006.01)
   *F16K 1/36* (2006.01)
   (Continued)

(52) U.S. Cl.
   CPC ............. *G05D 7/0647* (2013.01); *F16K 1/36* (2013.01); *F16K 1/42* (2013.01); *F16K 31/0655* (2013.01)

(58) Field of Classification Search
   CPC ........... F16K 1/36; F16K 1/42; F16K 31/0655
   See application file for complete search history.

(56) References Cited

U.S. PATENT DOCUMENTS 2,685,294 A * 8/1954 Gold .................. F16K 1/52
  138/46
3,155,367 A 11/1964 Gifford
(Continued)

FOREIGN PATENT DOCUMENTS

GB 917619 A 2/1963
JP 2004340260 A 12/2004
(Continued)

OTHER PUBLICATIONS

International Search Report and Written Opinion dated Feb. 25, 2020, issued in related International Application No. PCT/US2019/067608.

(Continued)

*Primary Examiner* — Eric Keasel
(74) *Attorney, Agent, or Firm* — McAndrews, Held & Malloy, Ltd.

(57) ABSTRACT

A valve assembly used to control fluid flow rate. The valve assembly comprises a valve plunger and a shield. The valve plunger forces fluid having a flow rate to flow between an inlet and an outlet in response to an applied actuator force. The actuator force is applied to a first side and the fluid is applied to a second side of the valve plunger. The shield minimizes or eliminates a destabilizing force caused by static pressure, created by fluid interaction on the second side. The shield is either coupled to, formed in, or suspended from underneath the valve plunger and extends a length into the outlet. The valve assembly further comprises an orifice between the inlet and the outlet wherein the orifice comprises at least one planar surface and at least one non-planar surface. The shield shields a section of the second side from the fluid.

17 Claims, 20 Drawing Sheets

(51) Int. Cl.
*F16K 1/42* (2006.01)
*F16K 31/06* (2006.01)

(56) References Cited

U.S. PATENT DOCUMENTS

| | | | |
|---|---|---|---|
| 4,114,850 A * | 9/1978 | Alamprese | F16K 1/54 251/86 |
| 7,513,441 B2 * | 4/2009 | Rodriguez-Amaya | F02M 63/0045 239/96 |
| 7,815,164 B2 * | 10/2010 | Dong | F16K 47/04 251/121 |
| 8,511,337 B2 * | 8/2013 | Nishimura | F16K 31/0655 251/129.08 |
| 2004/0261437 A1 | 12/2004 | Ohno | |
| 2007/0288180 A1 | 12/2007 | Lull et al. | |
| 2009/0188573 A1 | 7/2009 | Dong et al. | |
| 2012/0323379 A1 | 12/2012 | Robertson, III | |
| 2015/0345654 A1 | 12/2015 | Carmen et al. | |

FOREIGN PATENT DOCUMENTS

| | | |
|---|---|---|
| JP | 2009-174538 A | 8/2009 |
| JP | 5696093 B2 | 4/2015 |
| JP | 2016-509167 A | 3/2016 |
| WO | 201411044 A1 | 1/2014 |

OTHER PUBLICATIONS

Japanese Office Action dated Dec. 5, 2023, issued in Japanese Application No. 2021-535897.
Korean Office Action dated Dec. 22, 2023, issued in Korean Application No. 10-2021-7021767.

* cited by examiner

VALVE ASSEMBLY HAVING FLOW STREAMLINING ELEMENTS TO PREVENT OSCILLATING FLOW EFFECTS

CROSS-REFERENCE TO RELATED APPLICATIONS

This application claims the benefit of U.S. Provisional Application No. U.S. 62/784,197 filed on Dec. 21, 2018, the entire disclosure of which is expressly incorporated herein by reference.

BACKGROUND

Valve assemblies used, for example, in Mass Flow Controllers (MFCs) are designed to transmit fluid at a desired rate, which may be dependent on a particular application. It is generally beneficial to minimize the power consumption of a control valve to reduce the heat generated by the valve and to minimize the overall power draw of the MFC. However, low power/low force valves are subject to control issues as the fluid forces can become a significant part of the force acting on the valves. As such, the combination of low force valve with a simplified control system presents a particular challenge for engineers since the resultant MFC must still operate within acceptable standards.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

A particular challenge in reducing the production cost of MFC models is how to develop a valve assembly that can reliably maintain a desired fluid flow rate without an advanced diagnostics and control system while using a valve with a limited amount of force ($F_a$) or power. It has been found that in certain MFC applications that flow induced force ($F_{fi}$) can become a significant portion of the force balance on the valve, i.e., $F_{fi}$ becomes significant relative to $F_o$.

The flow induced valve force arises from a change in the static pressure on the bottom of the plunger. The change in static pressure is normally induced by a change in the flow patterns near the plunger, i.e., the flow attachment point moves from the plunger to the side walls (or vice versa) as the plunger moves up and down. These flow variations can lead to situations where the plunger, held at the same position, can have different fluid forces acting on it at different times, thus leading to oscillatory behavior.

Presented herein is a valve assembly designed to mitigate or eliminate the variation in $F_{fi}$ by providing a flow path that keeps the fluid streamlines consistent below the plunger, and in some embodiments insulating the plunger from the fluid forces beneath it.

Figure 1:
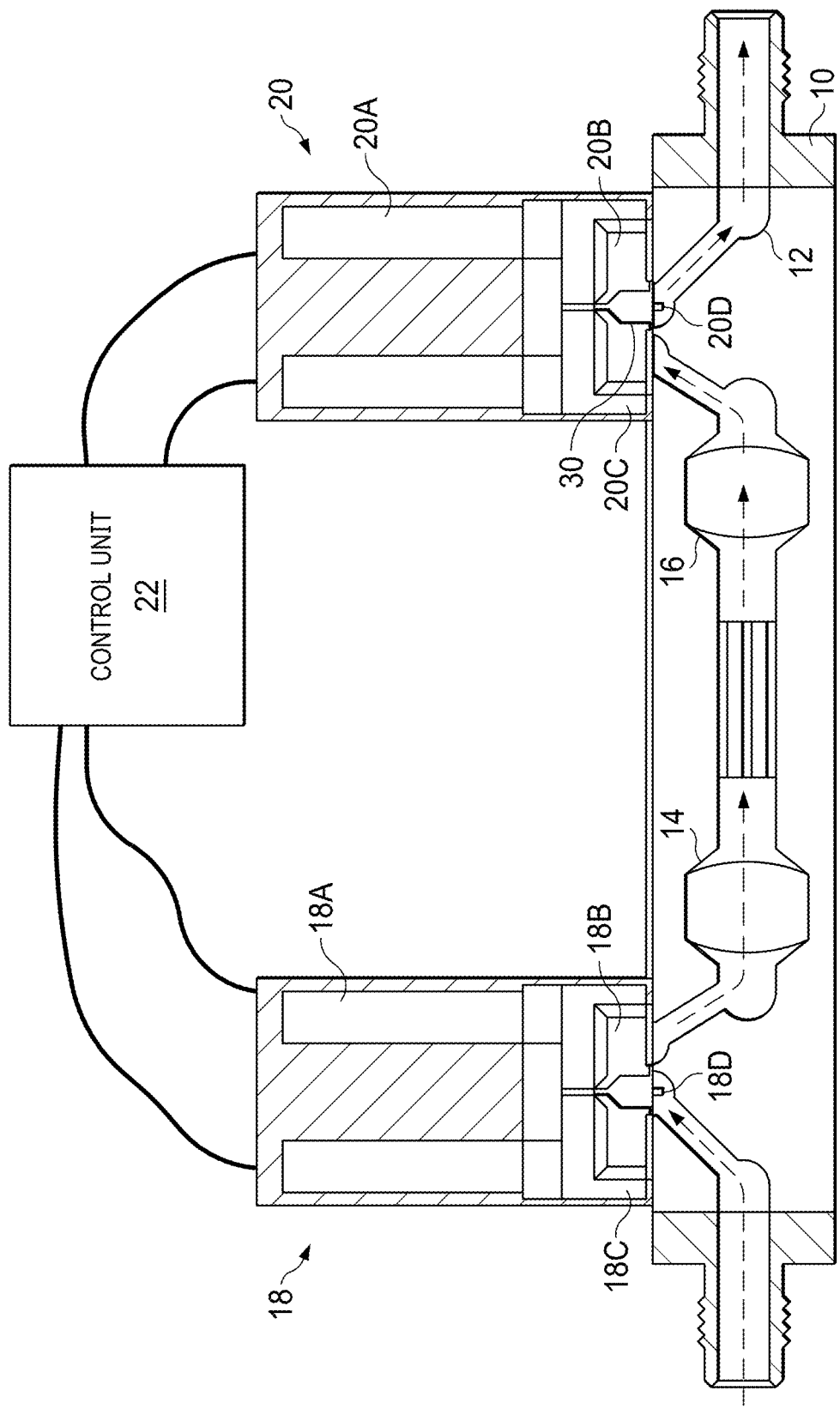
FIG. 1 is a diagram of an MFC having a valve assembly designed to mitigate or eliminate the formation of stagnate fluid and pressure, in accordance with certain example embodiments.

Referring now to FIG. 1), illustrated is a diagram of an MFC having a valve assembly designed to mitigate or eliminate variations in $F_{fi}$ underneath the plunger. The MFC comprises a base platform 10, a tubing channel 12 having volumes 14, 16, valve assemblies 18, 20, and control unit 22 communicable coupled to the valve assemblies 18, 20. Each valve assembly 20, 22 comprises an electrically controlled actuator 18A, 20A, a plunger 18B, 20B, coupled to the respective actuator 18A, 20A through a valve stem, and a plunger housing 18C, 20C. Shields 18D, 20D, i.e. fluid guides, are placed in the tubing channel 12 to minimize $F_{fi}$ variation under their respective plunger 18B, 20B. In an embodiment, the shields 18D, 20D can be coupled or formed therewith their respective plunger 18B, 20B. In another embodiment, the shields 18D, 20D can be suspended beneath their respective plunger 18B, 20B, e.g. by coupling the shields 18D, 20D to a section of tubing channel 12.

In a particular application, such as semi-conductor manufacturing, the base platform 10 is coupled to an upstream fluid source through a flow line and to a downstream process chamber. The fluid flows through the tubing channel 12 and the MFC operates to maintain a desired fluid flow rate. The control unit 22 may use measurements from a number of temperature and pressure sensors, not illustrated, to maintain the desired fluid flow rate. The flow dynamics of fluid traveling through tubing channel 12, volumetric designs of plunger housings 18C, 20C, and position of the plungers 18B, 20B can result in the concentration of fluid under the plungers 18B, 20B. When the plungers 20A, 22B are adjusted, in response to a control signal, a fluid Force ($F_{fl}$) due to the static pressure on the bottom of the plunger may overcome or cause an imbalance to the valve Force ($F_o$) applied by the actuators 18A, 20A. However, the introduction of the shields 18D, 20D in the tubing channel 12 can eliminate or significantly mitigate the variation in static pressure from inducing valve oscillation.

Figure 2A:
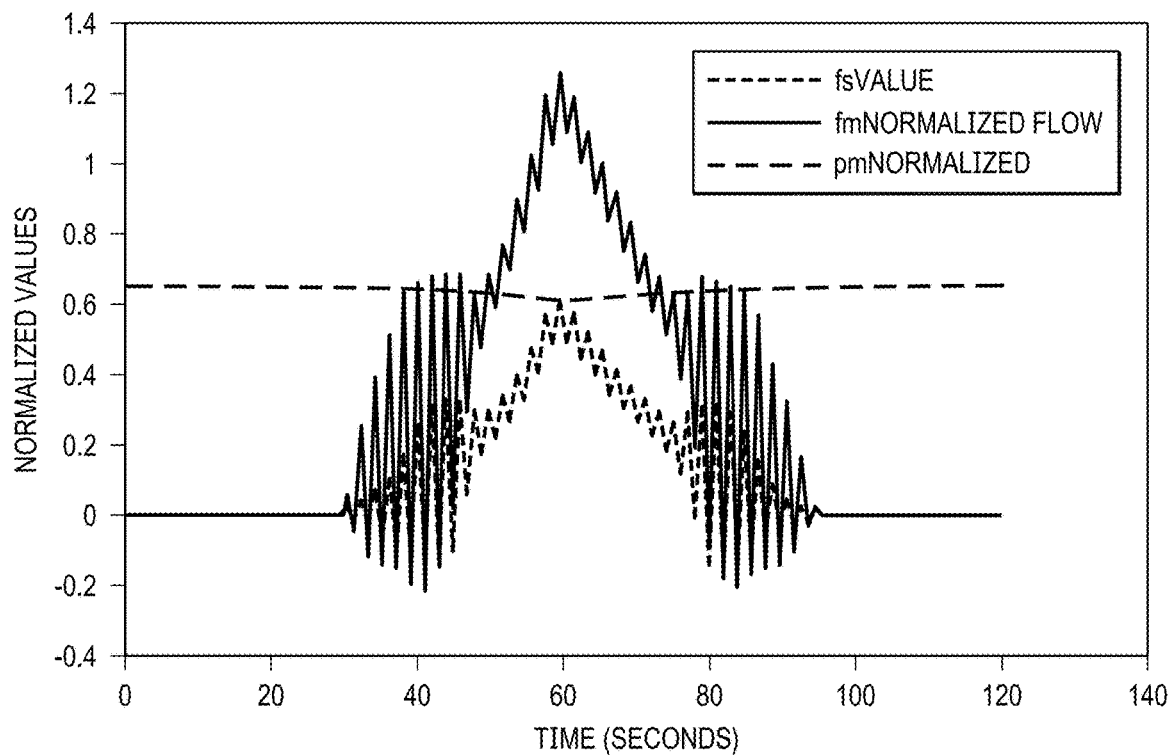
FIG. 2A is an illustration of is a graph of flow rate, absolute pressure, and differential pressure versus time for a valve of an MFC that doesn't include a shield, in accordance with certain example embodiments.
Figure 2B:
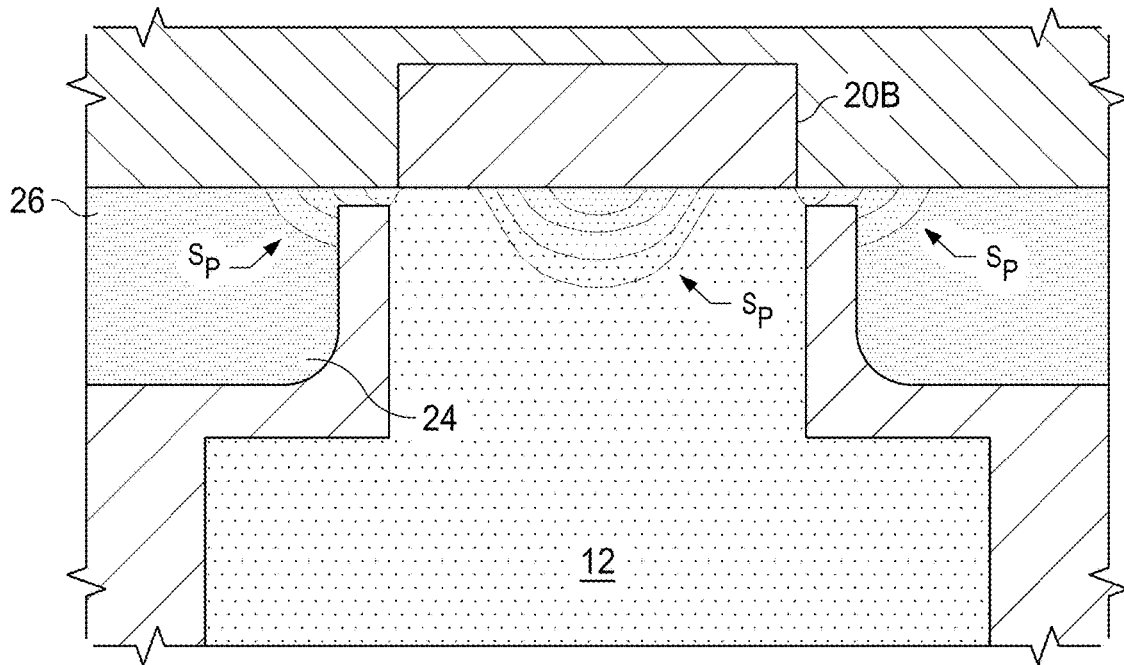
FIG. 2B is an illustration of the concentration of static pressure ($F_s$) under a plunger, an orifice, and an inlet, in accordance with certain example embodiments.

Referring now to FIG. 2A, illustrated is a graph of flow rate, absolute pressure, and differential pressure versus time for a valve of an MFC that doesn't include a shield, according to certain example embodiments. As is illustrated, as the valve is opened or closed, i.e. adjusted, noise, e.g. in the form of vibrations or valve oscillation, is introduced which causes the responding valve to become unstable, which results in a disruption of the desired flow rate. In practice, for sensitive applications, e.g. controlling the flow of fluid into semiconductor process chambers, which requires very precise flow rates, this can significantly affect production yield. As previously stated, flow variation or, more precisely, variation in the flow attachment point, under the plungers 18B, 20B results in a variation in $F_{fl}$ which can result in valve oscillation in response to manipulation of the plungers 20B, 22B. FIGS. 2B and 2C illustrate how the flow patterns under the plunger change with plunger movement according to the existing, no shield example embodiments.

FIG. 2A illustrates a plot of normalized N2 flow rate (short dashed line), absolute pressure (solid line) and LFE (Laminar Flow Element) pressure drop (dashed line) vs time as the valve input voltage is varied via a triangular ramp from 0.0 to max voltage to 0.0 volts over a 60 second window (from ~30 seconds to ~90 seconds). In the curve, a flow value of 1.0 corresponds to a flow of 50 slpm N2, an Absolute Pressure value of 1.0 corresponds to an N2 inlet pressure of 100 psia, and dP value of 1.0 corresponds to an N2 pressure drop of 1.0 psid under the given N2 (Nitrogen) flow and inlet pressure conditions. As shown in FIG. 2A, the flow becomes unstable as soon as the valve opens, and it remains unstable until a time of about 50 seconds. In response, the following oscillation mechanism is postulated: With the valve operating at low heights, i.e., low flow, there is a radial jet that accelerates due to the decreasing area as the jet heads toward the radial center. This jet then stagnates at the center of the orifice causing a pressure increase due to the velocity having to change direction (stagnate and turn downward resulting in an increase in static pressure below the plunger). This static pressure applies an upward force, which causes the valve plunger to lift to a higher position, i.e., the upward fluid force formed by the static pressure, exceeds the downward force (summation of the spring force and other forces such as the actuator on the plunger). As the plunger moves up, the flow separates from the plunger and the resulting radial jet velocity decreases which decreases the static pressure. At the same time, this movement (displacement) causes increase in spring force. The decreased static pressure, and increase in spring force (or change in other forces e.g., actuator force) reduces the total force on the plunger 20. This causes the total downward force to now be greater than the upward force which results in the plunger moving back down. The physical phenomena described above is what causes the plunger movement. Subsequent experimentation along with CFD simulations, verified the basic hypothesis and that placing a small solid cylinder on the bottom side center of the plunger 20 reduces the disruptive force. FIGS. 8A-8B, 9A-9B, and 10A-10B are velocity contour plots generated from CFD (Computational Fluid Dynamics) simulations that show fluid velocity below the plunger with and without a shield that clearly shows the shield dissipating the radial jets.

Figure 3A:
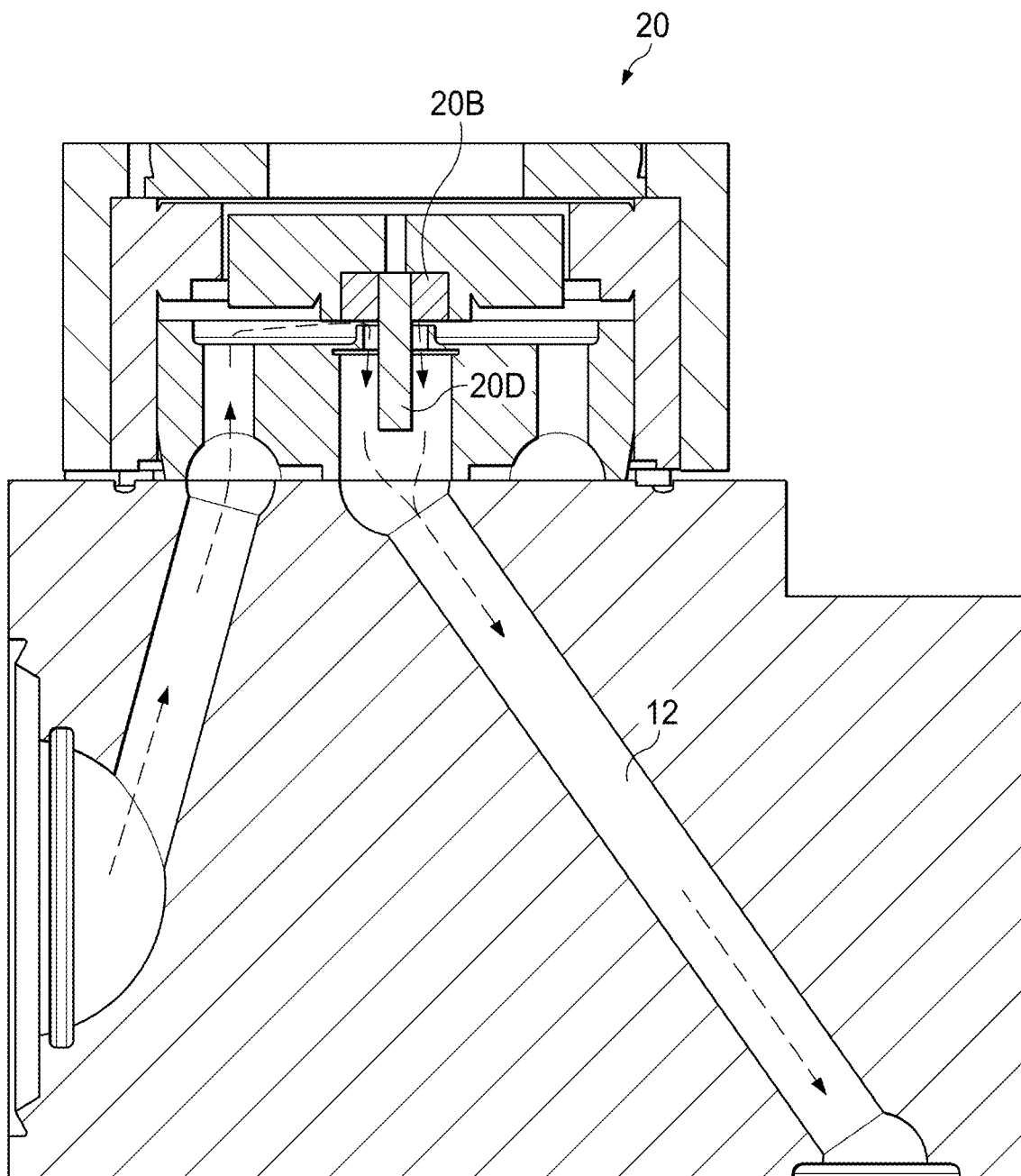
FIGS. 3A and 3B, illustrated are cut-away views of a valve having different shield configurations, in accordance with certain example embodiments.
Figure 3B:
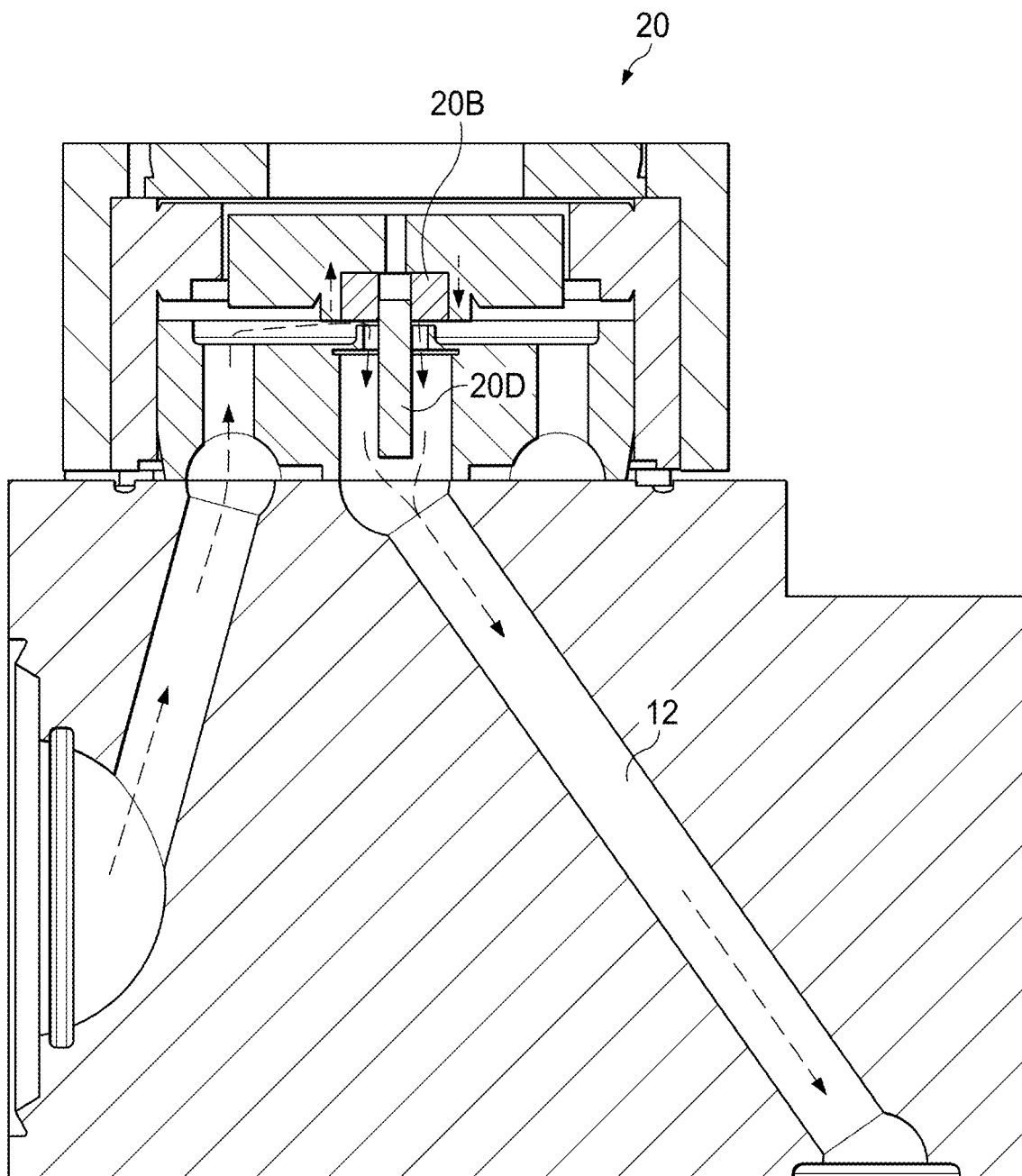

Referring now to FIGS. 3A, 3B, illustrated are cut-away views of valve 20 having different shield 20D configurations, according to certain example embodiments. The shield 20D is designed to have a radius and length wherein the radius is less than the radius of the plunger and the length extends into a section of tubing channel 12. The length and radius of the shield 20D can be determined based on the simulation, FIG. 2B, for a valve assembly for a particular MFC application. In FIG. 3A, the shield 20D is coupled to the plunger 20B or formed therewith, e.g. the actual manufacture of the plunger 20B. In FIG. 3B, the plunger 20B includes a cavity 26 configured for receiving the shield 20D. The shield 20D can be attached to the walls of the cavity 26. Although, the cavity 26 is optional, i.e. the shield 20D can be coupled with the tubing channel 12 and suspended under the plunger 20B. The space between the plunger 20B and the shield 20D can be approximately 0.010 inches, e.g. The shield 20D protects the underside of the plunger 20C by acting as a fluid guide so that the variation in the fluid streamlines under the plunger 20D is minimized.

Figure 4:
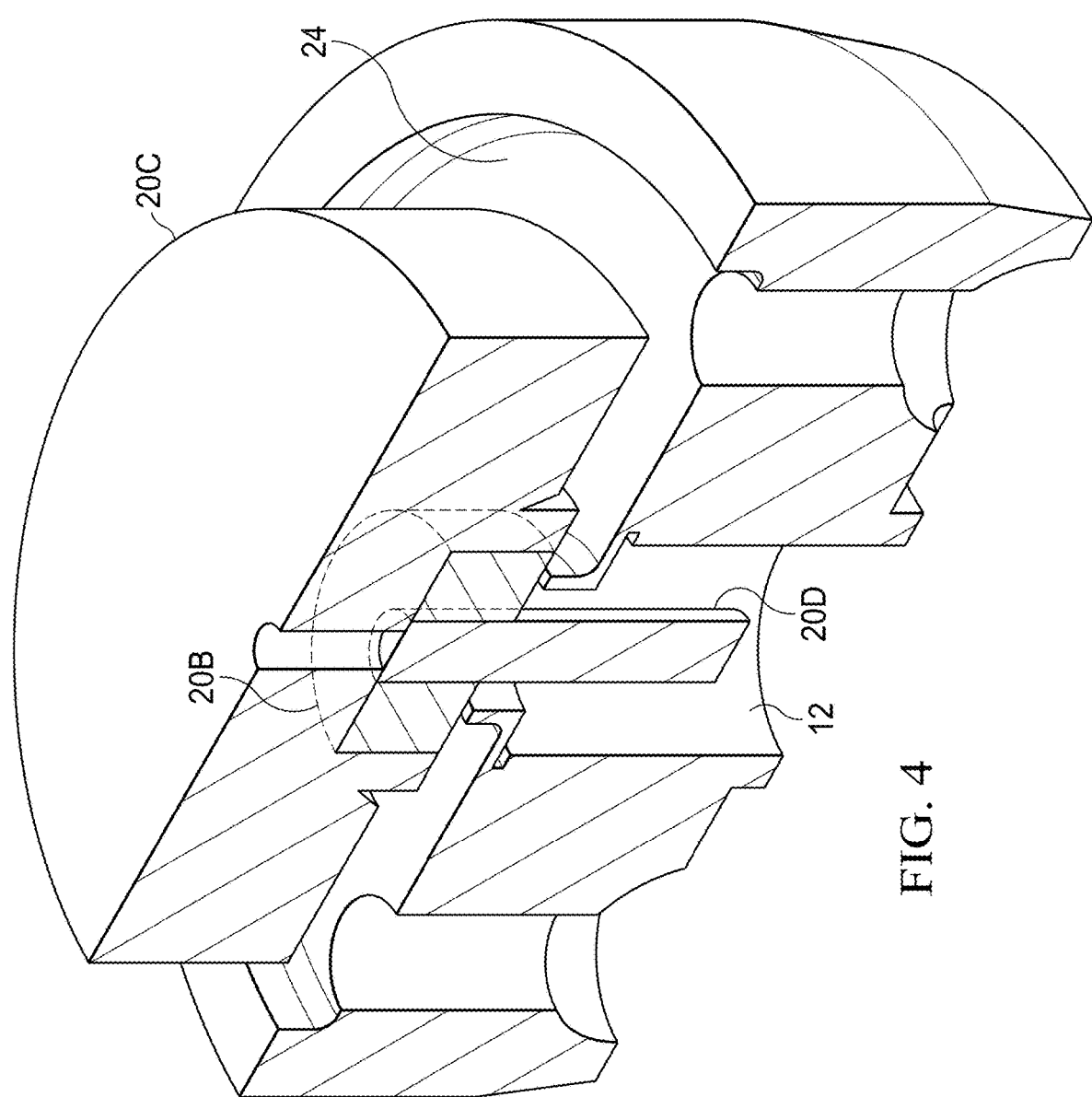
FIG. 4 is an illustration of is an isometric view of a tubing channel, a plunger, a plunger housing, a shield, and an orifice, in accordance with certain example embodiments.
Figure 5A:
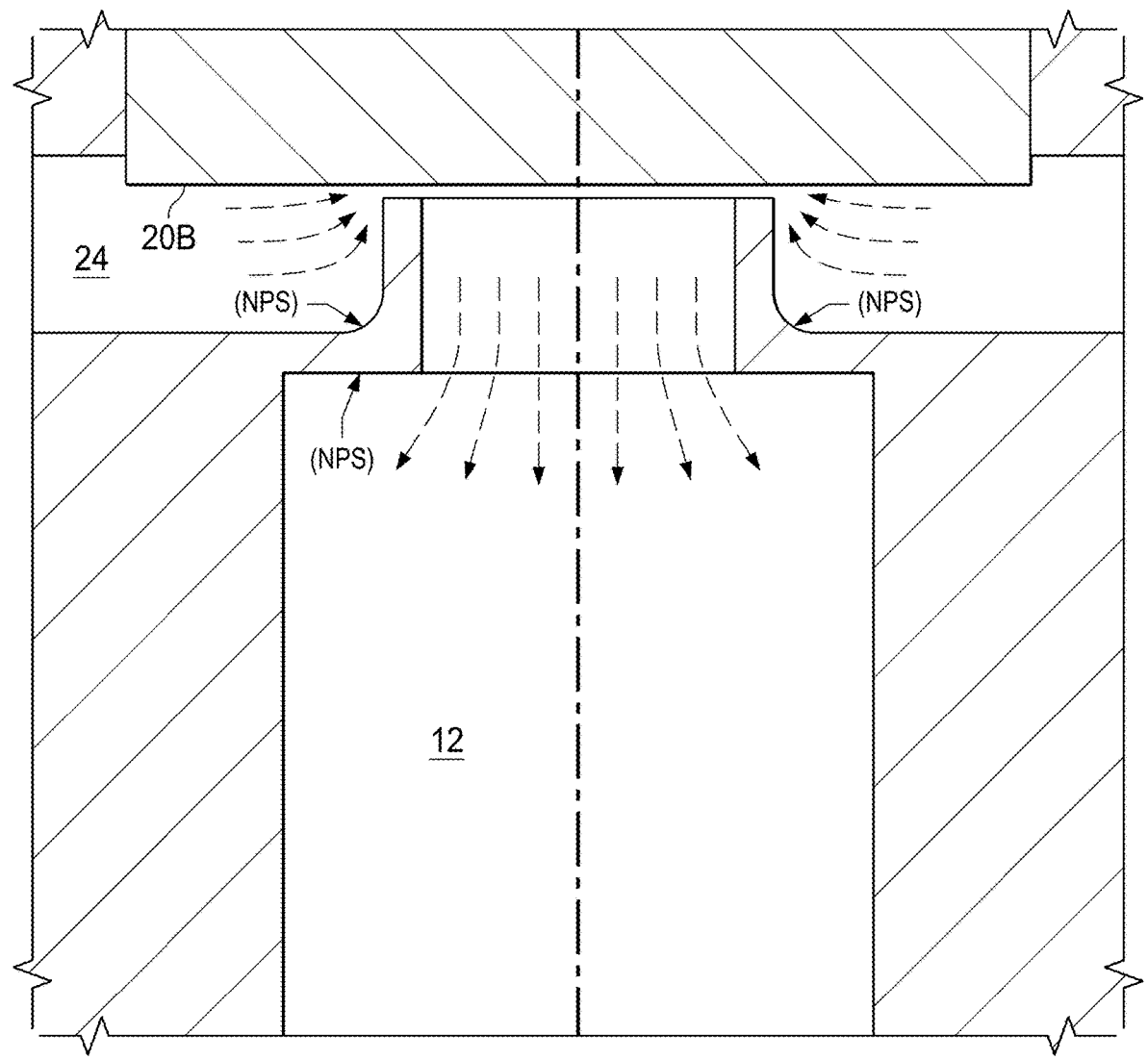
FIG. 5A is an illustration of a sectional cut-away view of a tubing channel, a plunger, and an orifice with the orifice have at least one non-planar surface (NPS), in accordance with certain example embodiments.
Figure 5B:
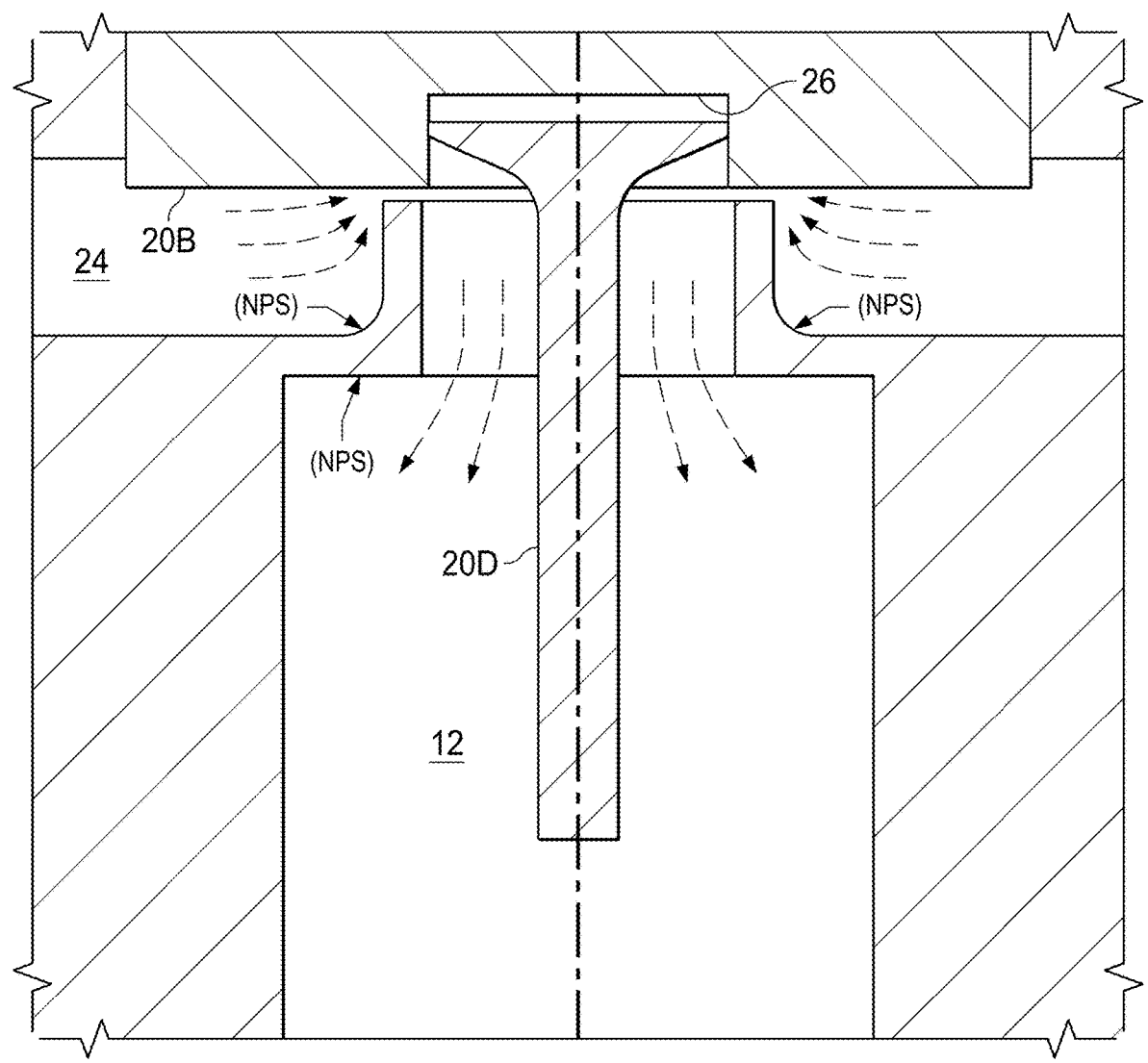
FIGS. 5B-5C are illustrations of a sectional cut-away view of a tubing channel, plunger, a shield, and an orifice with the orifice having at least one non-planar surface (NPS), in accordance with certain example embodiments.
Figure 5C:
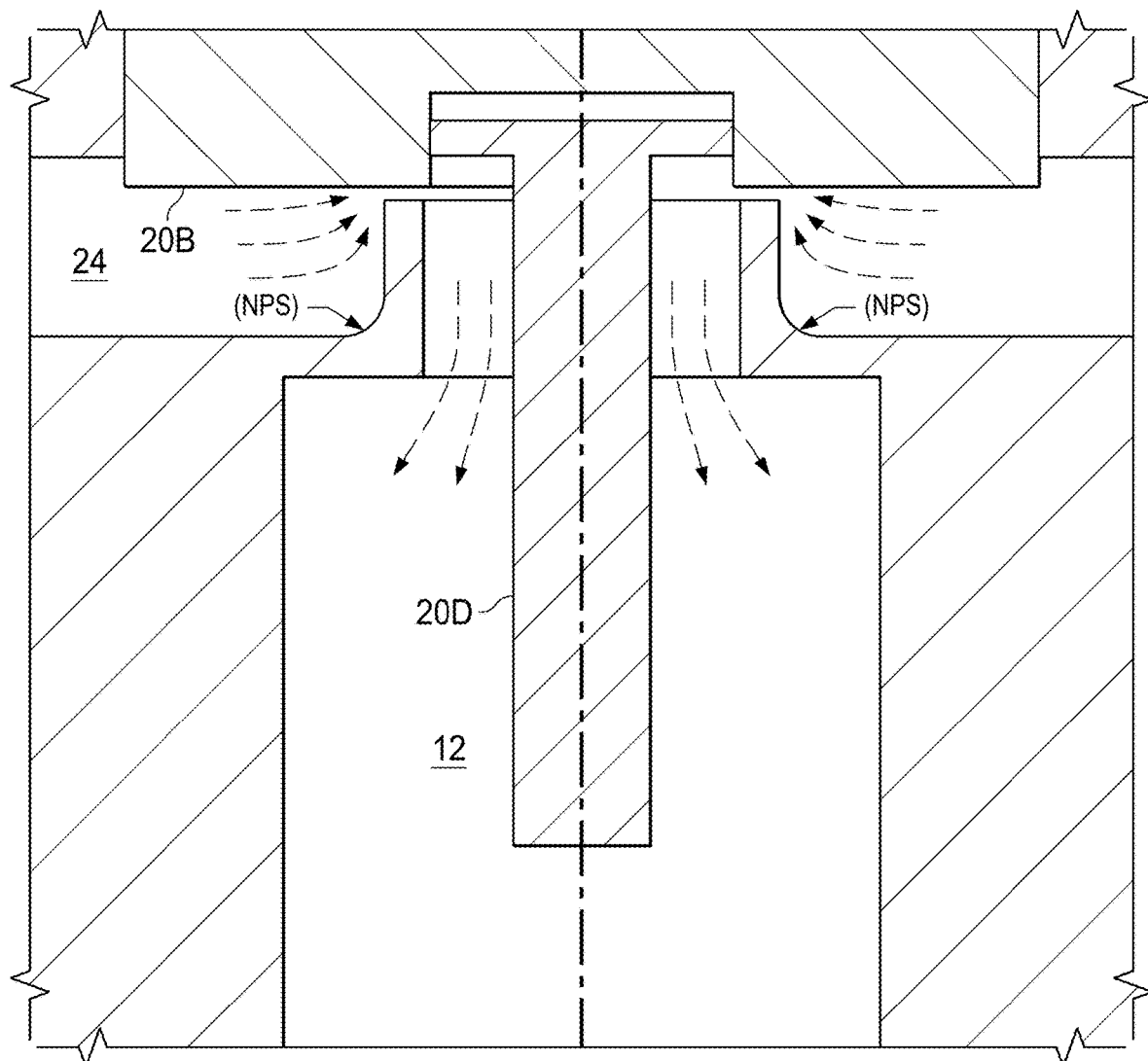
Figure 6A:
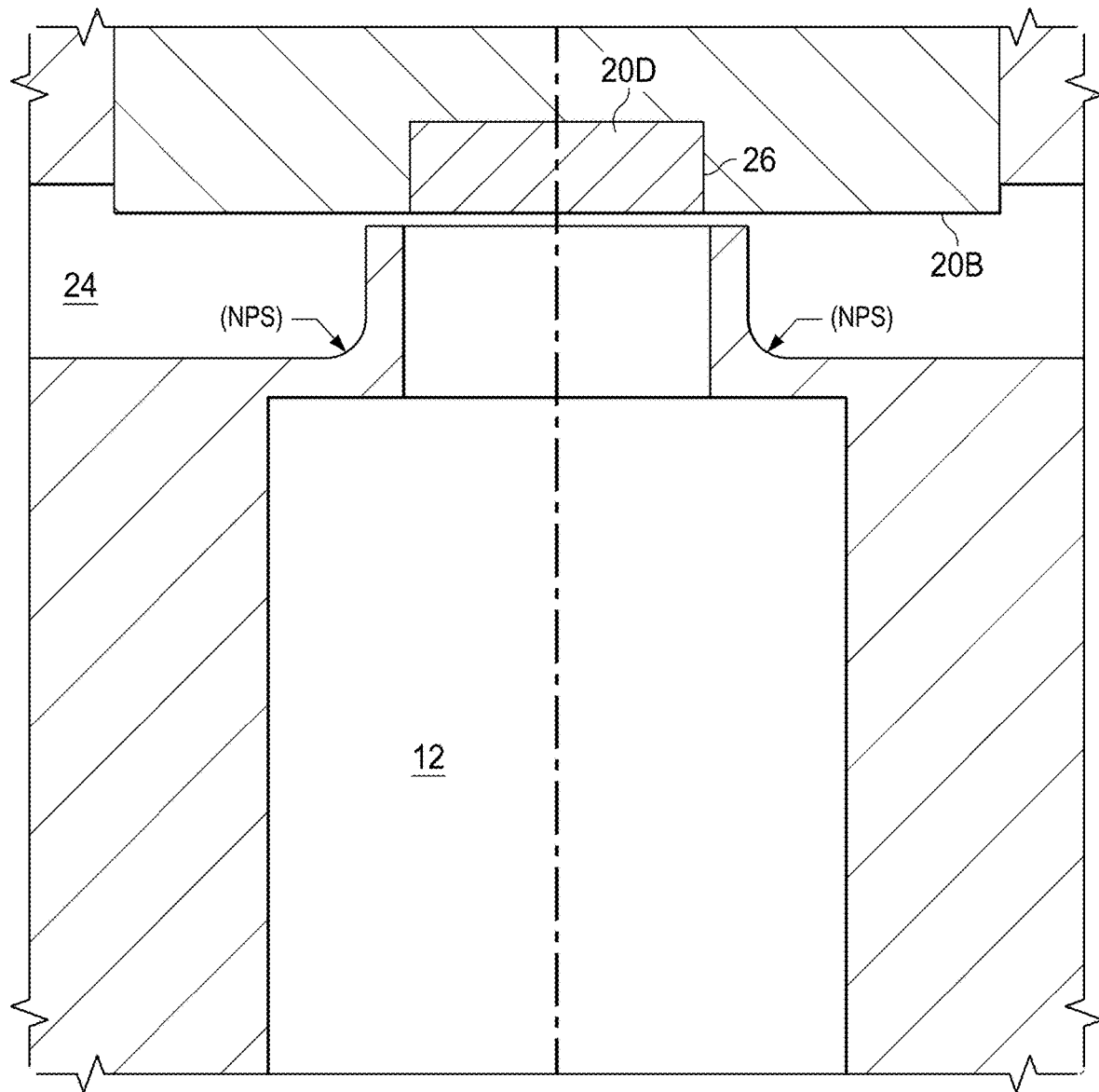
FIGS. 6A-6H are illustrations of various cut-away views of a tubing channel, a plunger, a shield, and an orifice having various configurations of the plunger and NPS' on at least one of the tubing channel and orifice, in accordance with certain example embodiments.
Figure 6B:
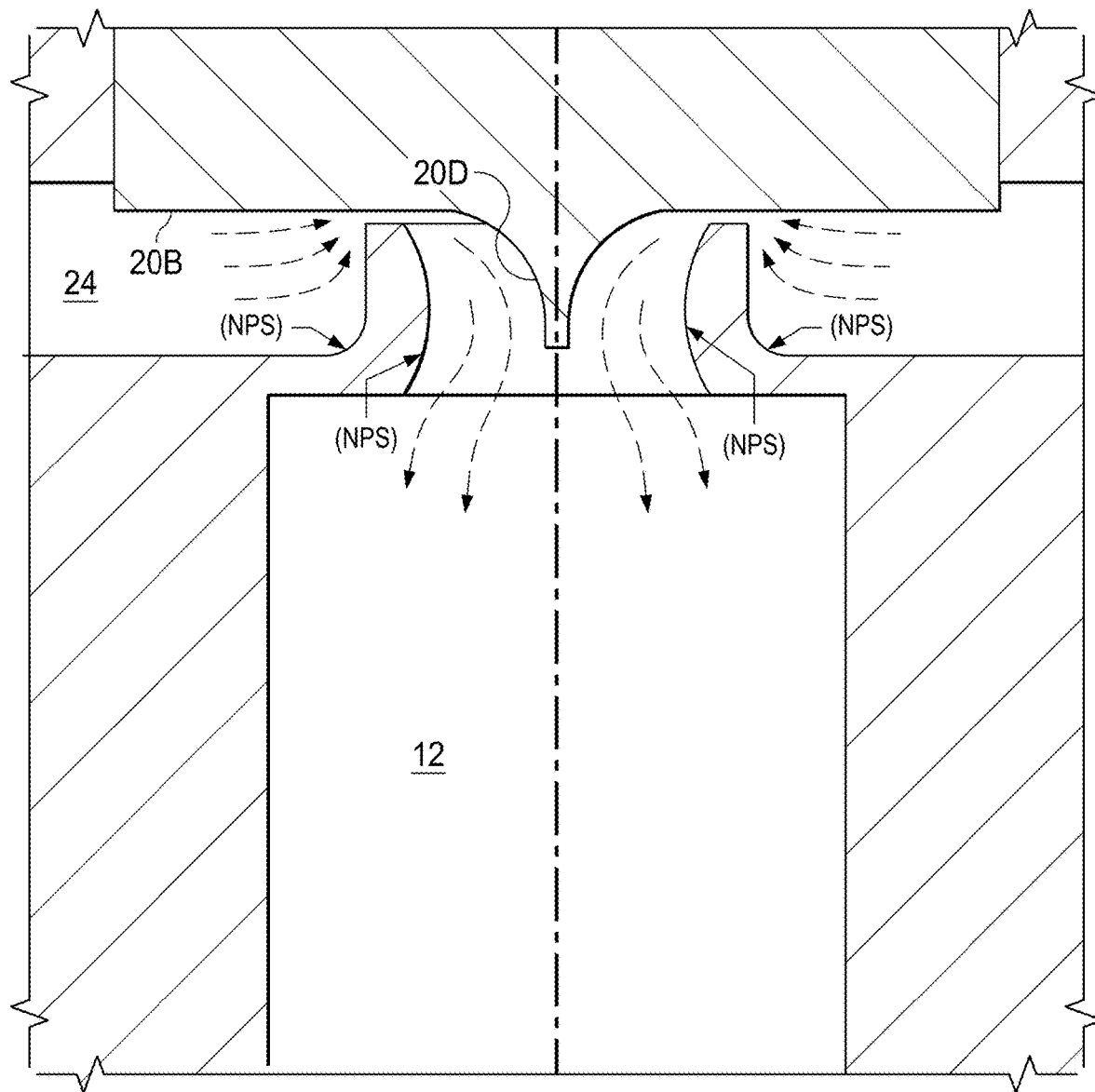
Figure 6C:
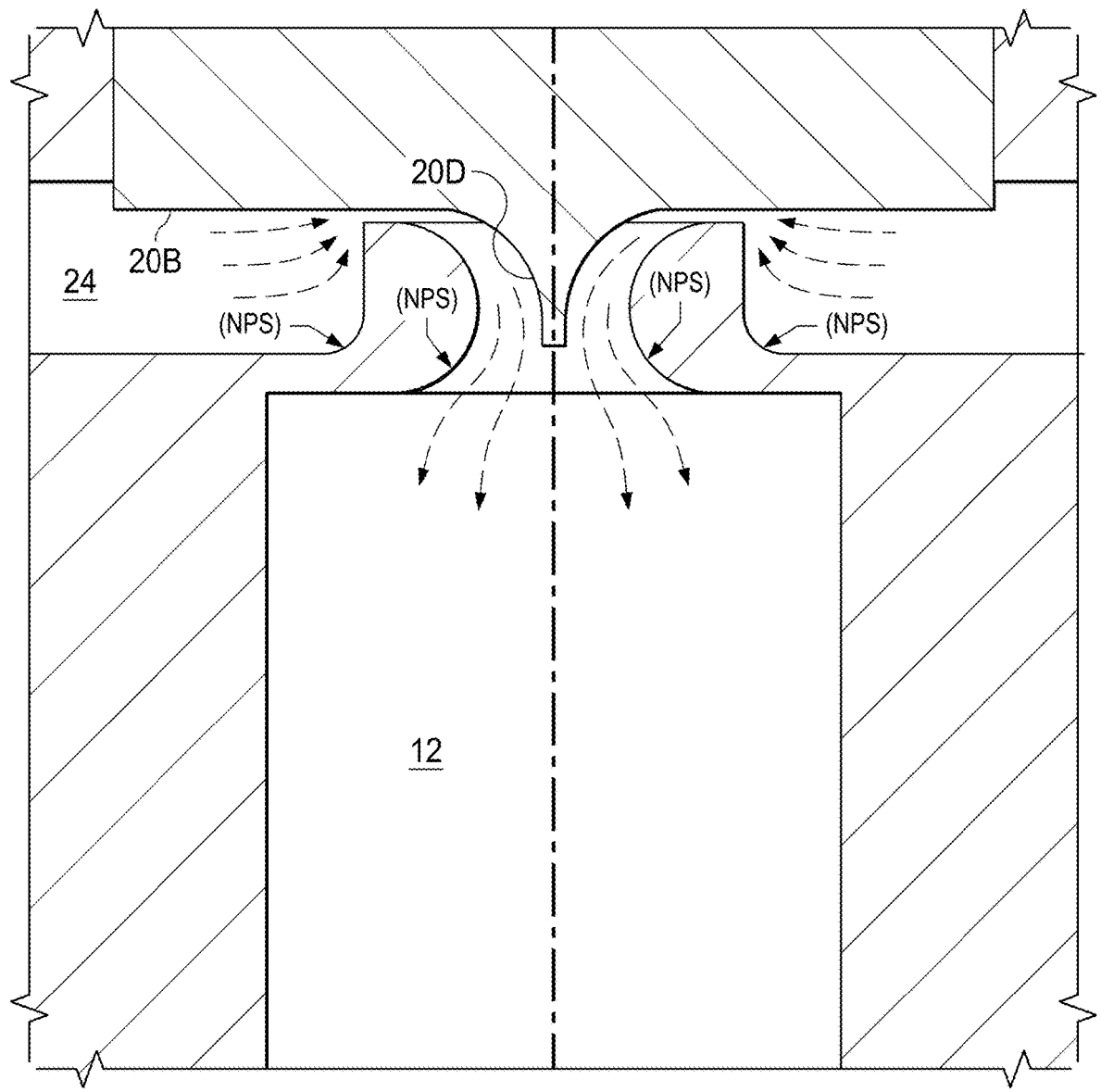
Figure 6D:
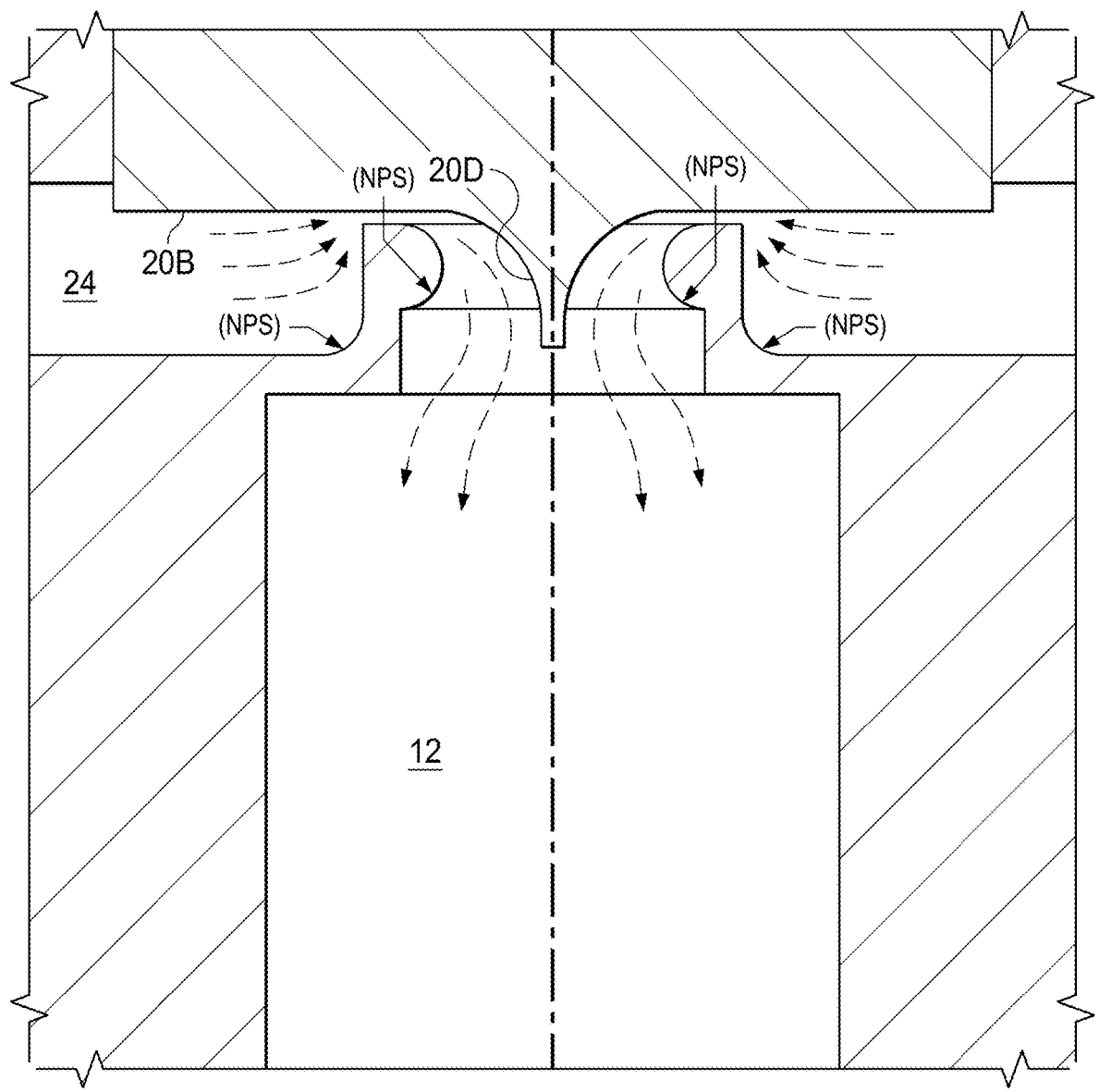
Figure 6E:
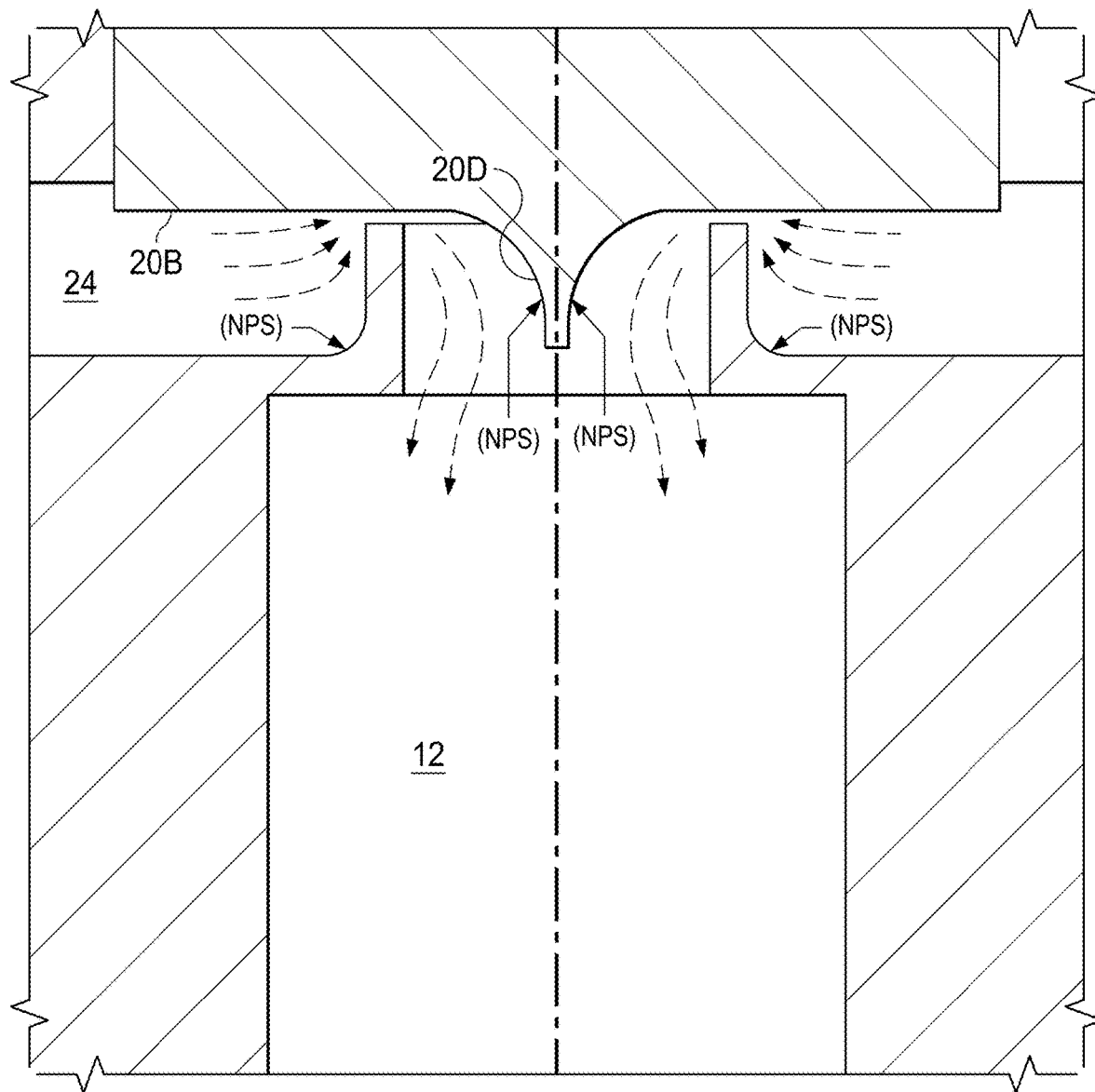
Figure 6F:
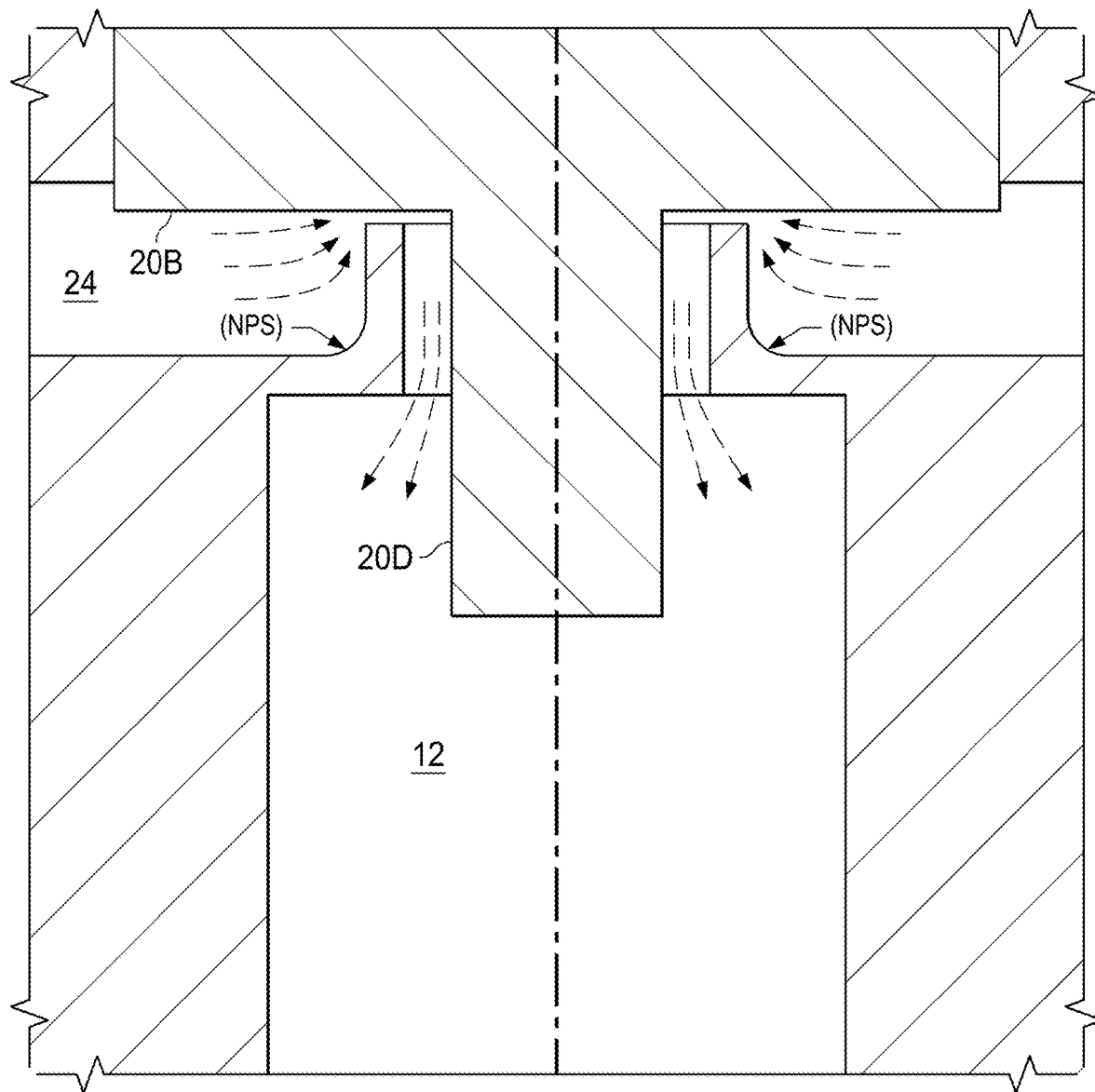
Figure 6G:
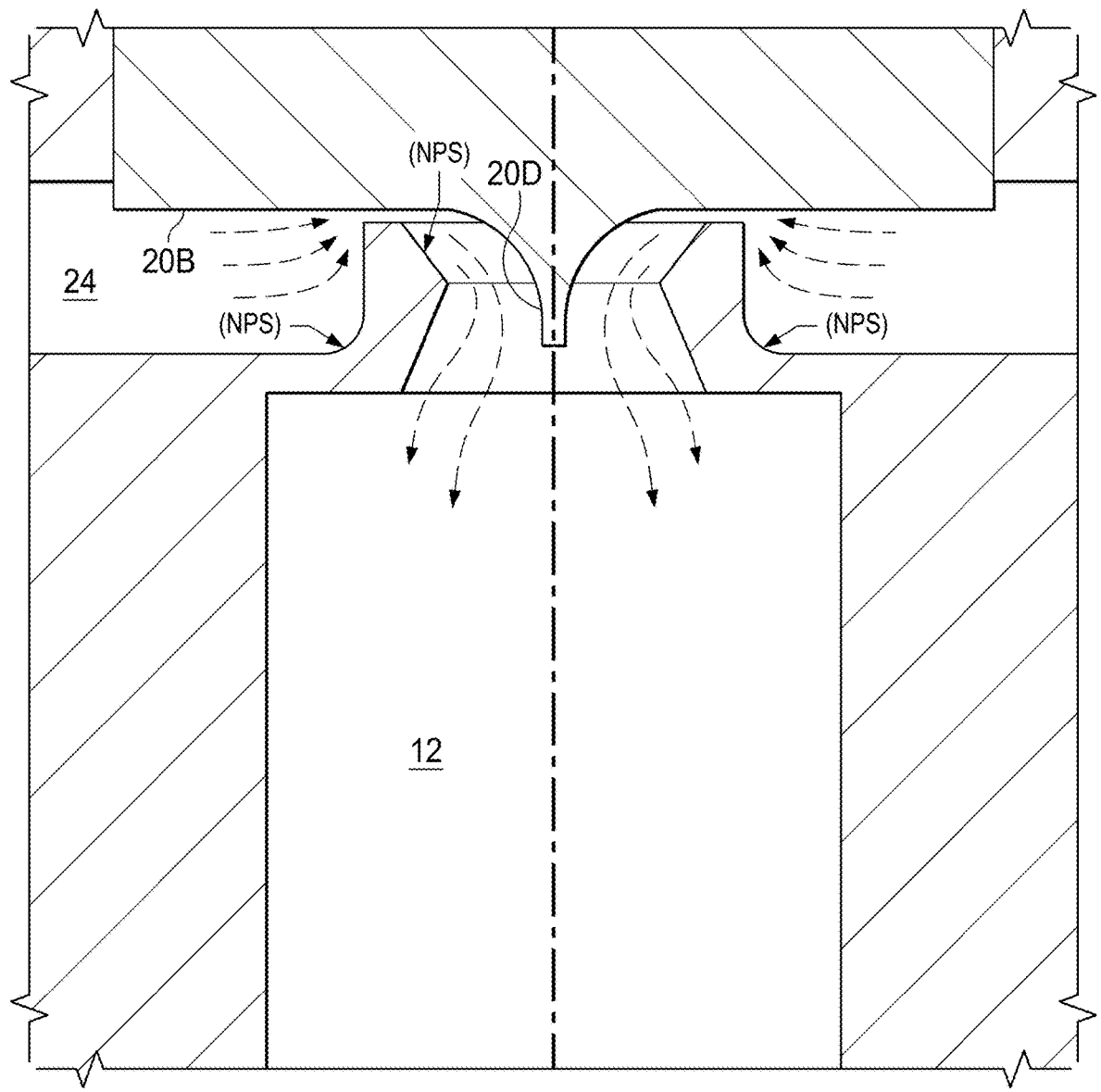
Figure 6H:
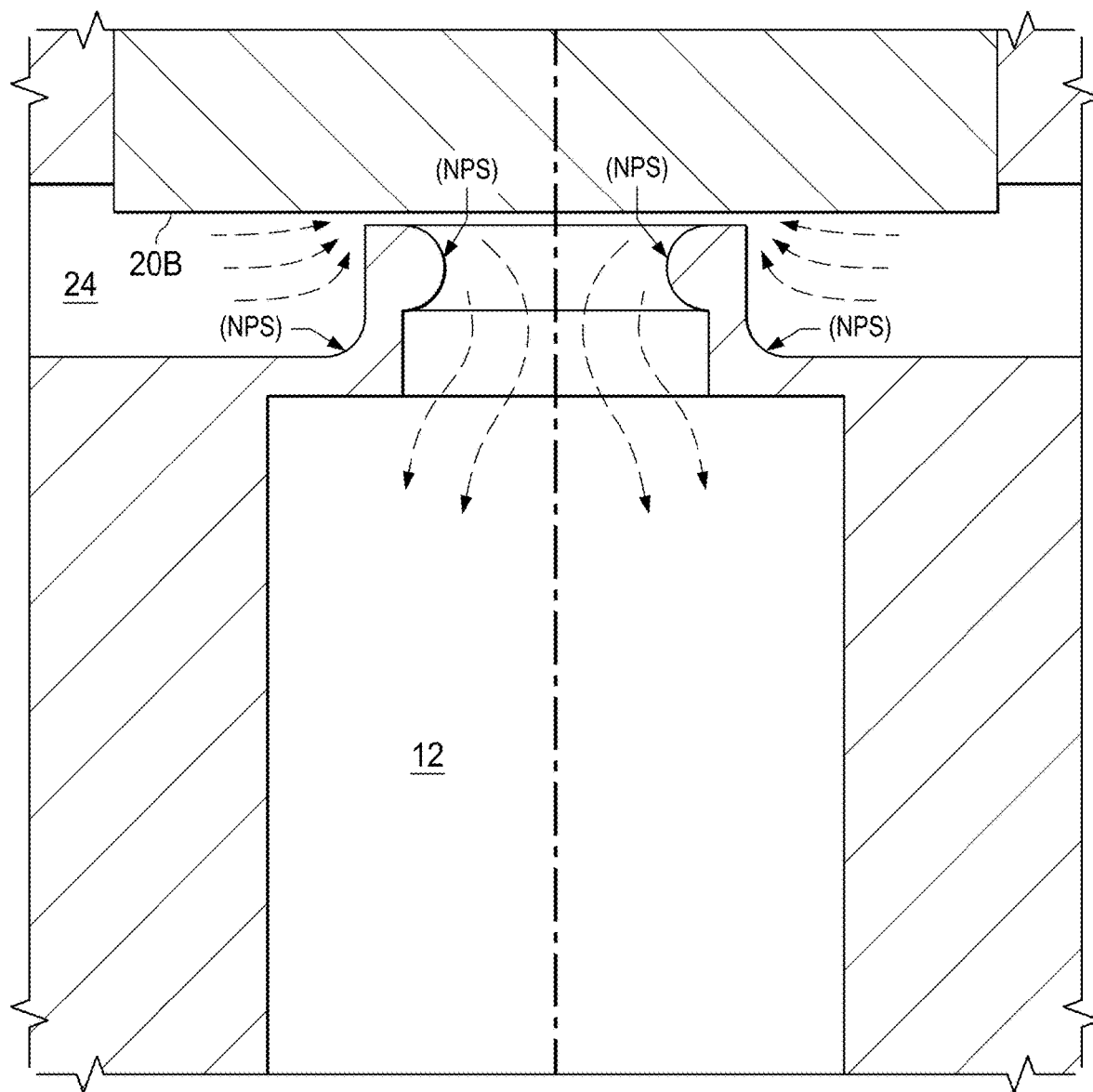

Referring now to FIG. 4, illustrated is an isometric view of the tubing channel 12, plunger 20B, plunger housing 20C, shield 20D, and orifice 24, according to certain example embodiments. As is illustrated, the shield 20D protects an area beneath the plunger 20B, i.e. a surface area beneath the plunger 20B and acts as guide that directs fluid down the tubing channel 12 and prevents the fluid from stagnating under the plunger 20B. FIG. 5A is a sectional cut-away view of the tubing channel 12, plunger 20B, and orifice 24 for the standard valve embodiment that is subject to oscillation. FIG. 5B is a sectional cut-away view of the tubing channel 12, plunger 20B, shield 20D, and orifice 24 with the orifice having at least one non-planar surface (NPS), according to certain example embodiments. The NPSs streamline the flow path and provide for a more constant flow attachment point under the plunger which reduces variation in $F_{fl}$. This more constant $F_{fl}$ provides for a more constant delivered flow. It should also be understood that NPSs can also be created on the surface of the tubing channel 12. Illustrated in FIGS. 6A-6H are various cut-away views of the tubing channel 12, plunger 20B, shield D, and orifice 24 having various configurations of the plunger 20B and NPS' on at least one of the tubing channel 12 and orifice 24.

Figure 7A:
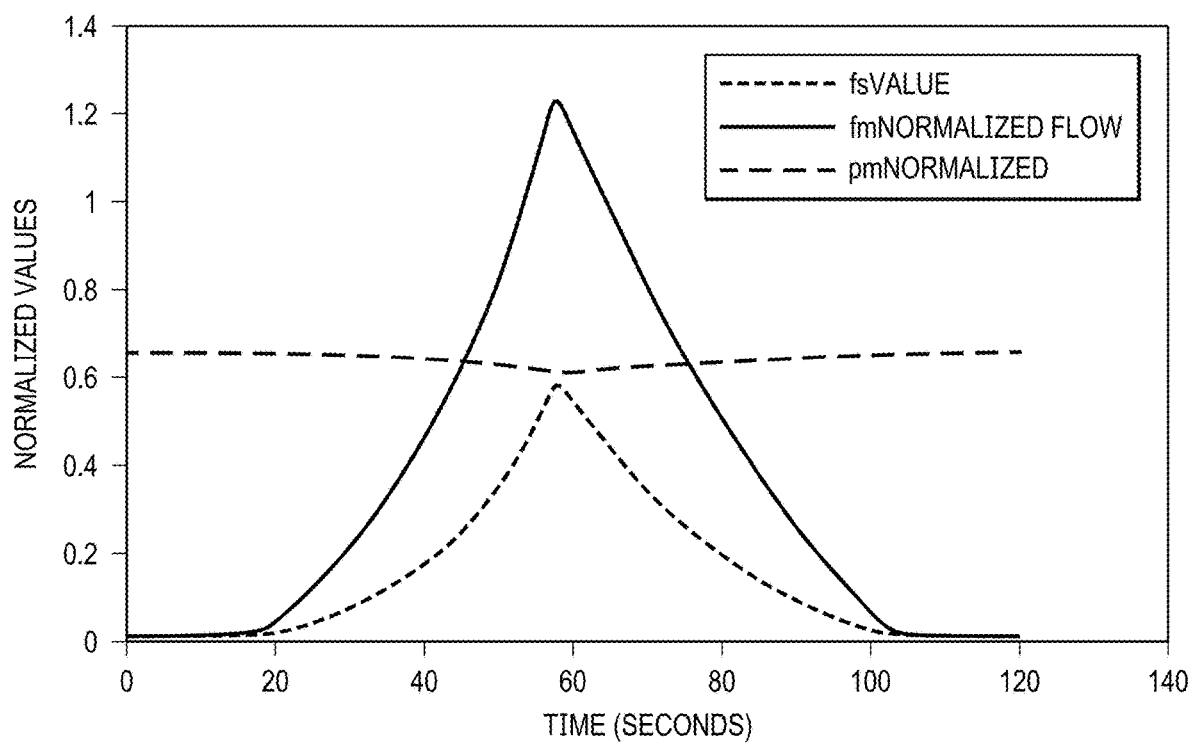
FIG. 7A is an illustration of a graph of fluid flow rate, absolute pressure, and differential pressure versus time for a valve of an MFC that includes a shield, in accordance with certain example embodiments.
Figure 7B:
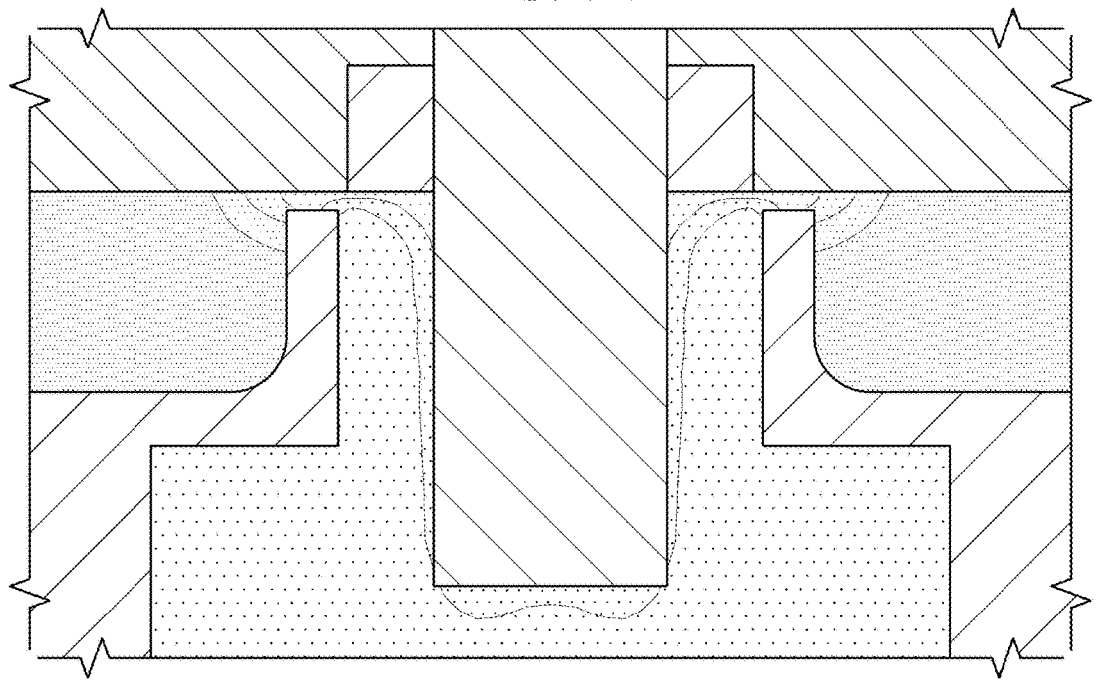
FIG. 7B is an illustration of a corresponding simulation, e.g. CFD simulation, where the plunger has been modified to include a shield to dissipate the inward radial jet at a relatively large diameter, in accordance with certain example embodiments.
Figure 8A:
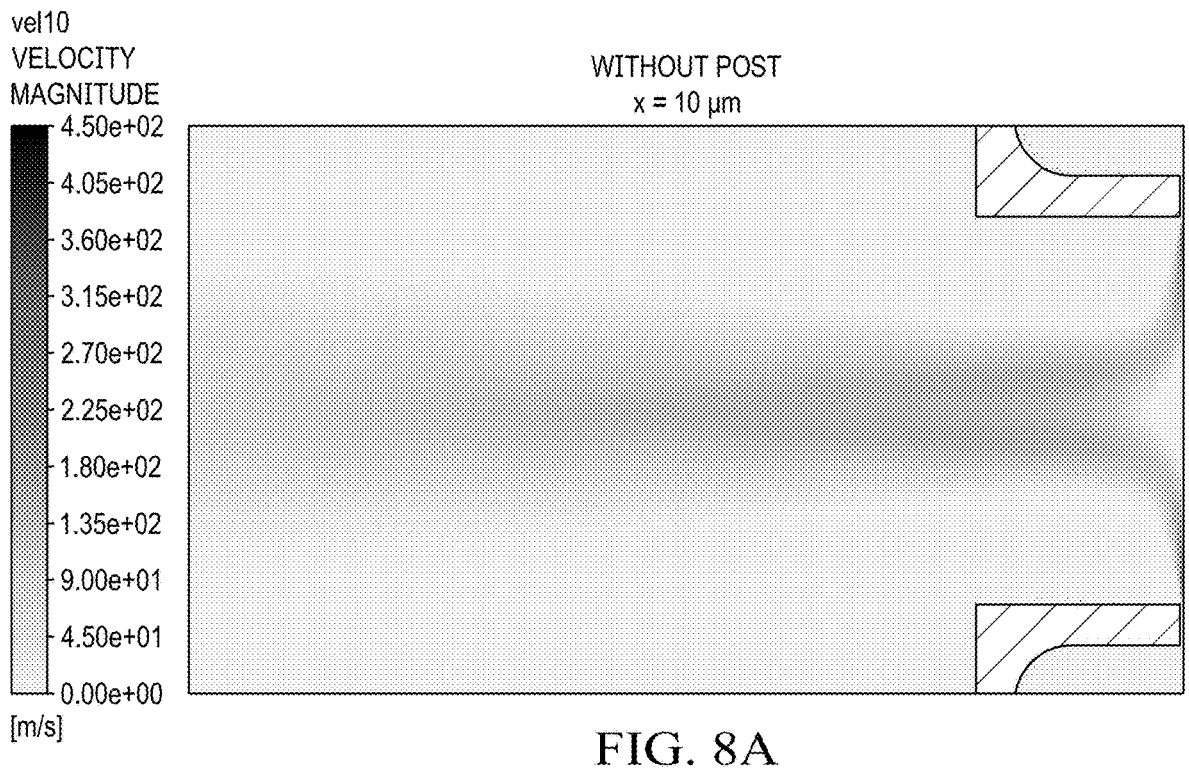
FIGS. 8A-8B, 9A-9B, and 10A-10B are velocity contour plots generated from CFD (Computational Fluid Dynamics) simulations that show fluid velocity below the plunger with and without a shield.
Figure 8B:
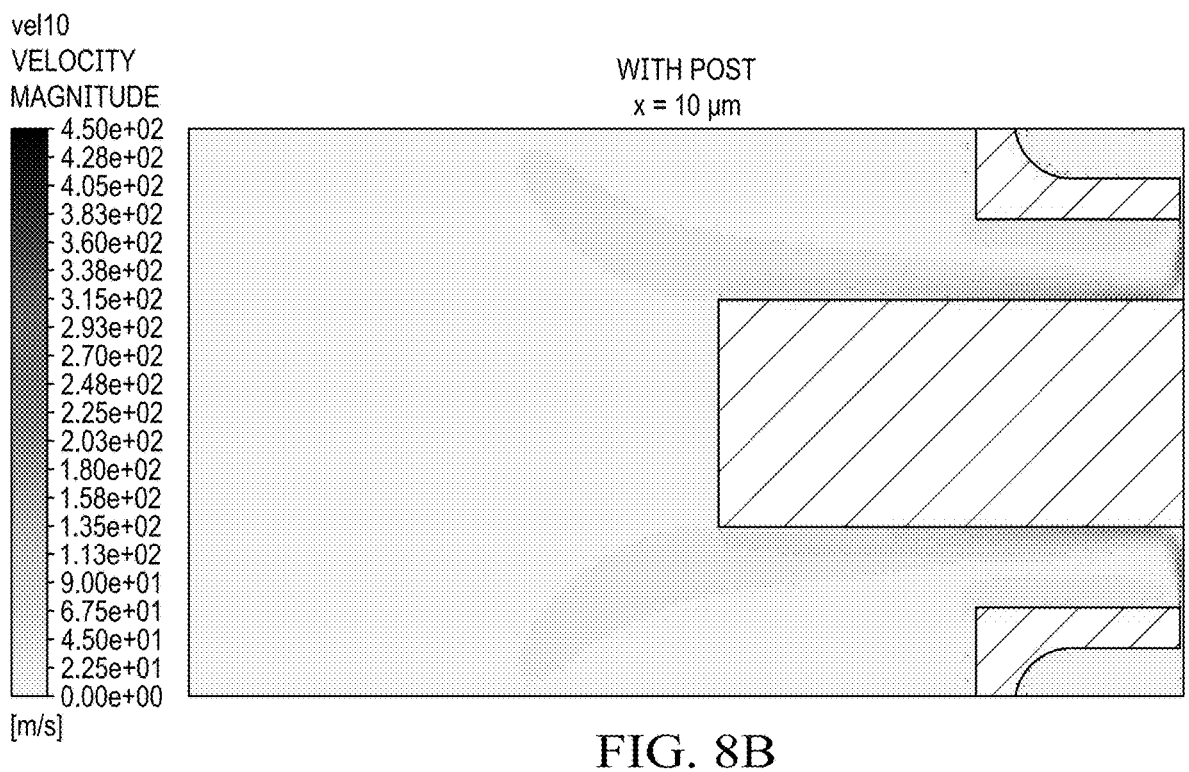
Figure 9A:
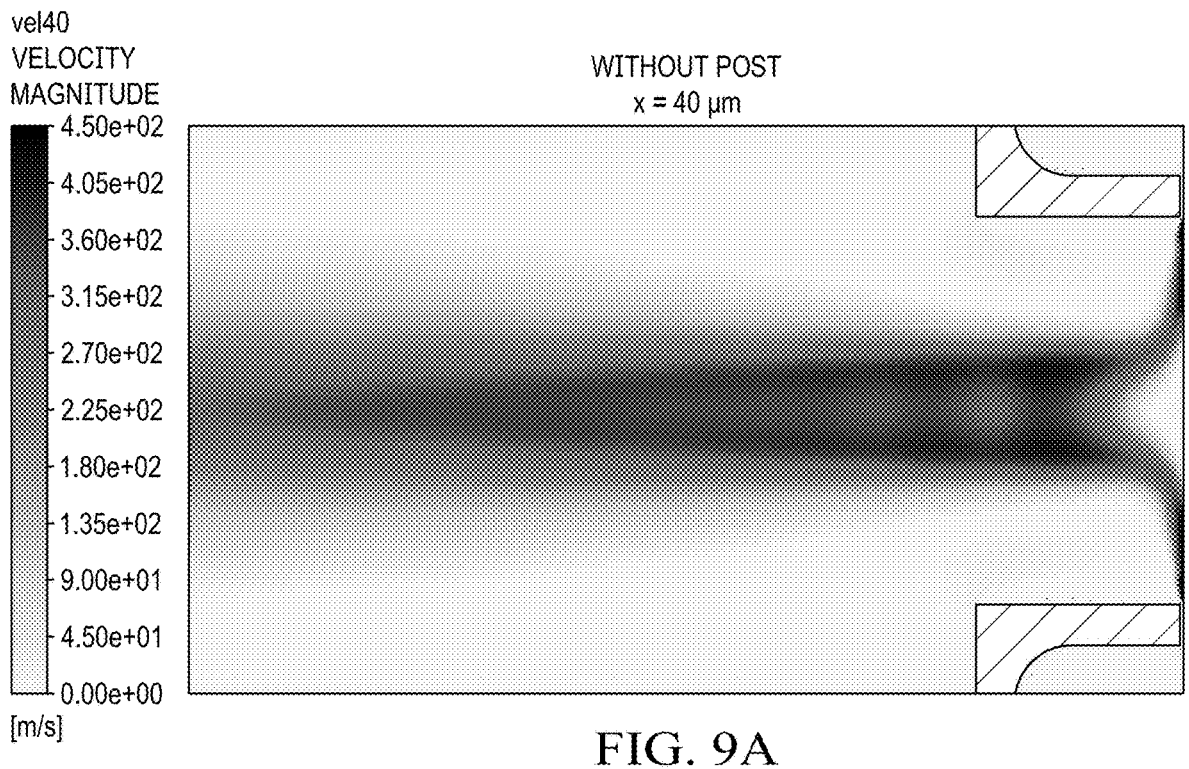
Figure 9B:
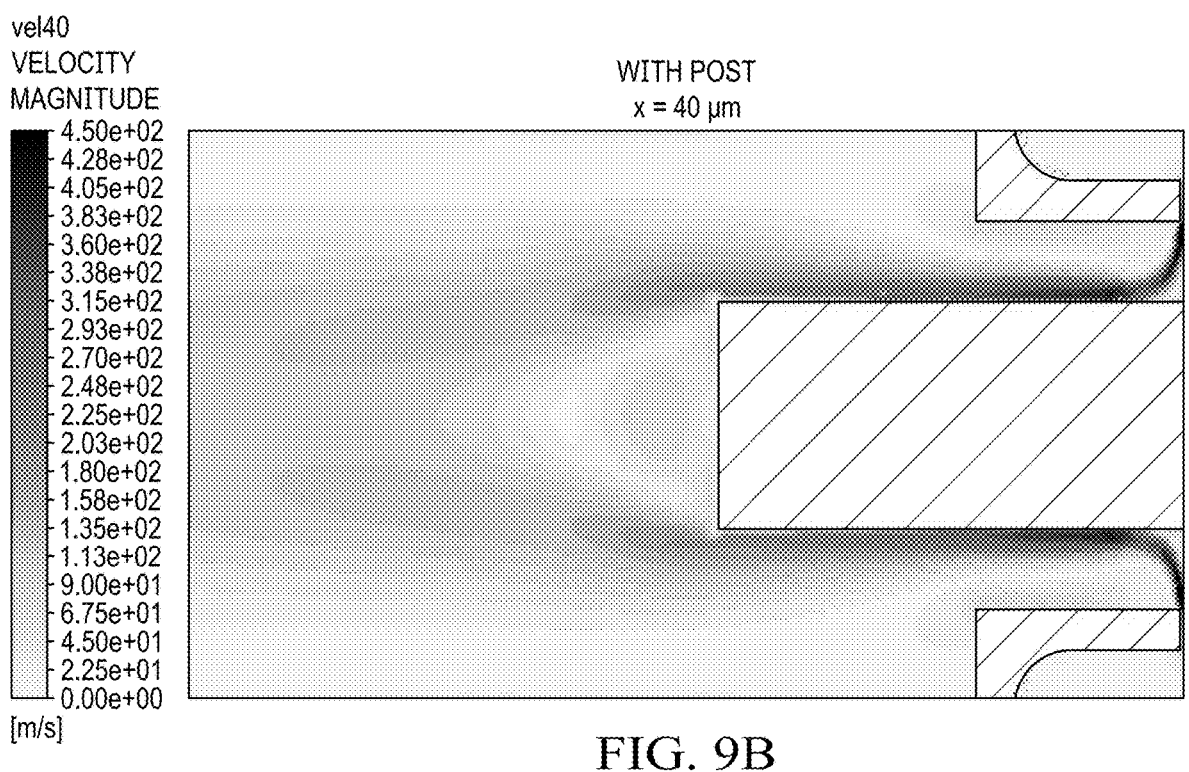
Figure 10A:
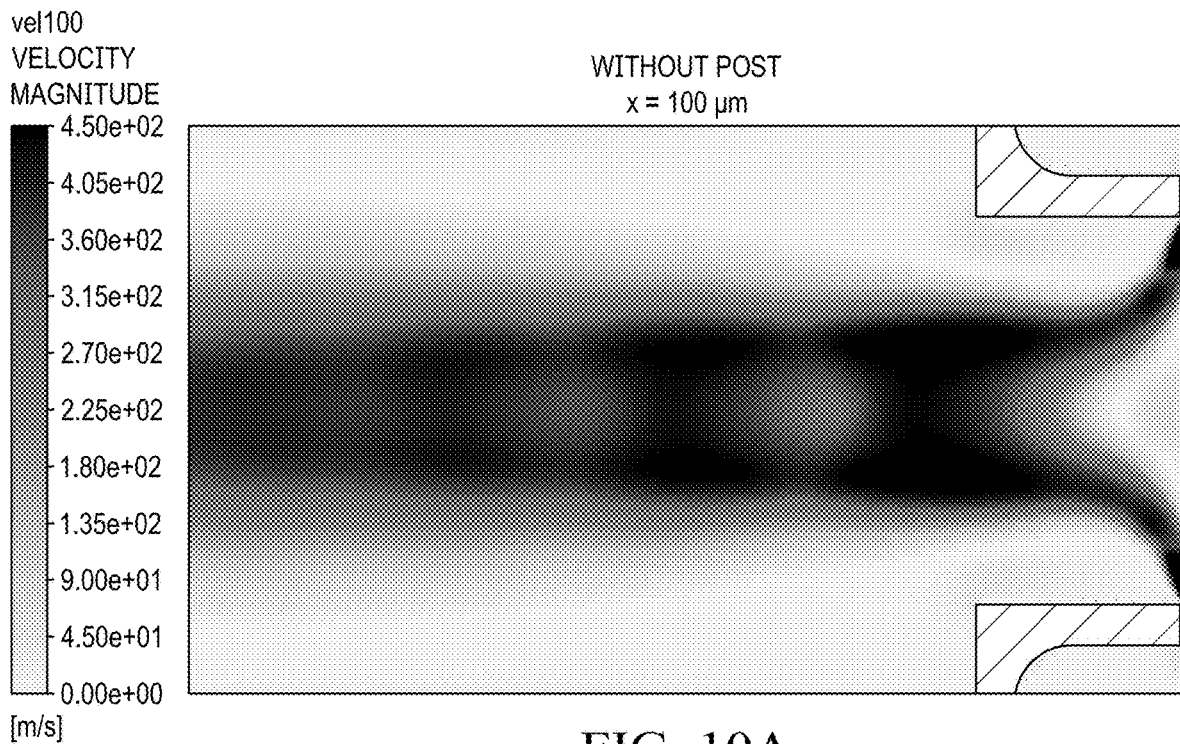
Figure 10B:
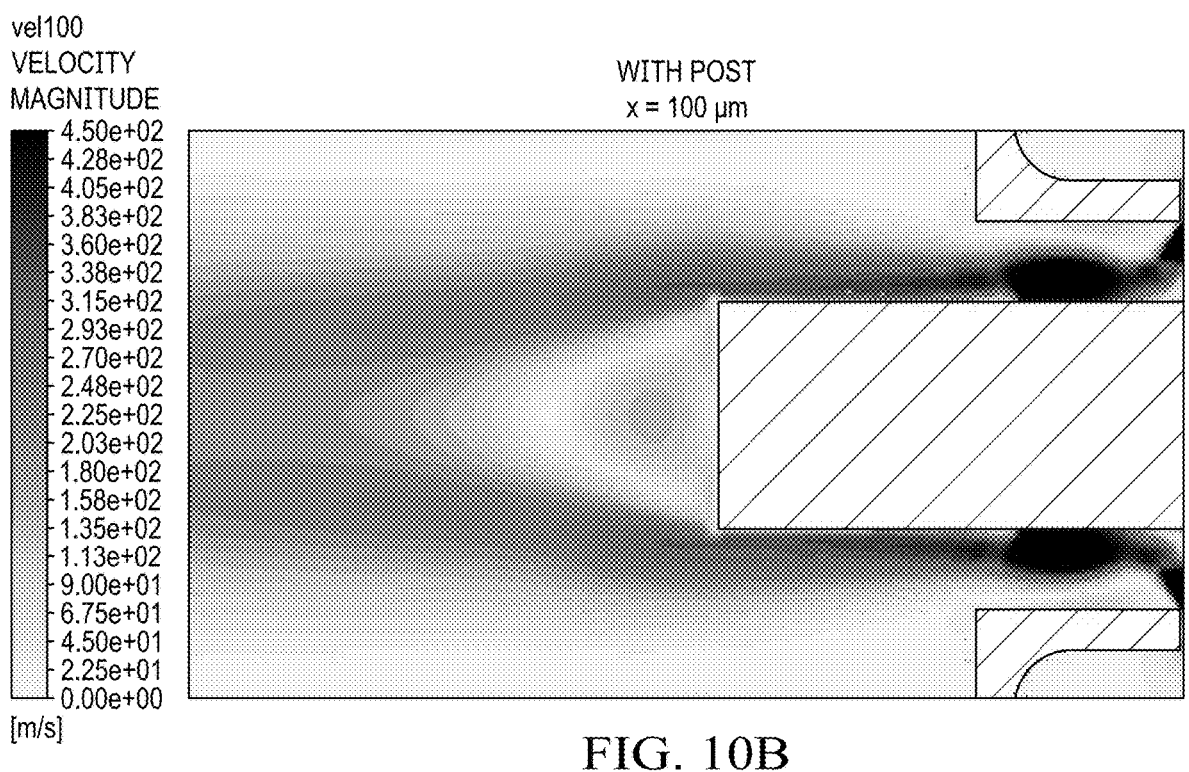

FIG. 7A is an illustration of a graph of fluid flow rate, absolute pressure, and differential pressure versus time for a valve of an MFC that includes a shield, according to a certain example embodiment shown in FIGS. 7B & 7C. Relative to FIGS. 2B and 2C, the flow attachment point is more constant throughout the plunger stroke shown FIGS.

7B and 7C. The noise present in the graph of FIG. 2B is eliminated, or negligible, and a clean, i.e. noise free, is delivered to the downstream process. The use of the post eliminates or minimizes the variation in $F_{fl}$ which results in a stable flow vs time curve in the triangular voltage wave shown in FIG. 7A. FIGS. 7B and 7B are corresponding simulations, e.g. CFD simulations, where the plunger has been modified to include a post to dissipate the inward radial jet at a relatively large diameter, e.g. shield diameter is 0.063 inches and the orifice diameter is approximately 0.100 inches. Alternatively, tests have shown a 0.040 inch diameter post will also work as well as the 0.063" post but will provide the same flow as the original design at chocked condition (35 psia in and 2 psia out with x=0.015 inches).

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a valve assembly used to control fluid flow rate, the valve assembly comprising: a valve plunger configured to force fluid having a flow rate to flow between an inlet and an outlet, the valve plunger having an actuator force applied to a first side and the fluid in fluid communication with a second side; and a shield configured to one of minimize and eliminate a destabilizing force caused by static pressure, created by fluid interaction on the second side;

Clause 2, the valve assembly of clause 1, wherein the valve plunger further comprises a recessed section on the second side configured to receive the shield;

Clause 3, the valve assembly of clause 2, wherein the shield is one of coupled to, formed in, and suspended from underneath the valve plunger and extends a length into the outlet;

Clause 4, the valve assembly of clause 1, wherein the valve assembly further comprises an orifice between the inlet and the outlet wherein the orifice comprises at least one planar surface and at least one non-planar surface;

Clause 5, the valve assembly of clause 1, wherein the shield shields a section of the second side from the fluid;

Clause 6, the valve assembly of clause 1, wherein the shield channels fluid from a section of the second side and into the outlet;

Clause 7, the valve assembly of clause 1, wherein the inlet is a plurality of inlets; wherein the valve plunger further comprises an orifice between the plurality of inlets and the outlet wherein the orifice comprises at least one planar surface and at least one non-planar surface; wherein the shield shields a portion of the second side from the fluid; and wherein the shield channels fluid from a first section of the second side and a second section of the second side and into the outlet; wherein the shield is one of formed with the plunger, coupled to the plunger, and placed in a flow path under the plunger;

Clause 8, a mass flow controller for controlling fluid flow rate, the mass flow controller comprising: an electronically controlled actuator, controllable in response to changes in a set flow rate for creating an actuator force; a valve assembly communicable coupled to the electronically controlled actuator and comprising a valve plunger, the valve plunger configured to force fluid having a flow rate to flow between an inlet and an outlet, the valve plunger having the actuator force applied to a first side and the fluid in fluid communication with a second side; and a shield configured to one of minimize and eliminate a destabilizing force caused by static pressure, created by fluid interaction on the second side;

Clause 9, the mass flow controller of clause 8, wherein the valve plunger further comprises a recessed section on the second side configured to receive the shield;

Clause 10, the mass flow controller of clause 8, wherein the shield is one of coupled to, formed in, and suspended from underneath the valve plunger and extends a length into the outlet;

Clause 11, the mass flow controller of clause 8, wherein the valve assembly further comprises an orifice between the inlet and the outlet wherein the orifice comprises at least one planar surface and at least one non-planar surface;

Clause 12, the mass flow controller of clause 8, wherein the shield shields a section of the second side from the fluid;

Clause 13, the mass flow controller of clause 8, wherein the shield channels fluid from a section of the second side and into the outlet;

Clause 14, the mass flow controller of clause 8, wherein the inlet is a plurality of inlets; wherein the valve plunger further comprises an orifice between the plurality of inlets and the outlet wherein the orifice comprises at least one planar surface and at least one non-planar surface; wherein the shield shields a portion of the second side from the fluid; and wherein the shield channels fluid from a first section of the second side and a second section of the second side and into the outlet; wherein the shield is one of formed with the plunger, coupled to the plunger, and placed in a flow path under the plunger;

Clause 15, a method for controlling fluid flow rate, the method comprising: creating an actuator force; communicable coupling the actuator force to a valve assembly; forcing fluid having a flow rate to flow between an inlet and an outlet using a valve plunger of the valve assembly, wherein the forcing further comprises: applying the actuator force to a first side of the valve plunger; applying the fluid with a second side of the valve plunger; and one of minimizing and eliminating, using a shield, a destabilizing force caused by static pressure, created by fluid interaction on the second side;

Clause 16, the method of clause 15, wherein the valve plunger further comprises a recessed section on the second side configured to receive the shield;

Clause 17, the method of clause 15, wherein the shield is one of coupled to, formed in, and suspended from underneath the valve plunger and extends a length into the outlet;

Clause 18, the method of clause 15, wherein the valve plunger further comprises an orifice between the inlet and the outlet wherein the orifice comprises at least one planar surface and at least one non-planar surface;

Clause 19, the method of clause 15, wherein the shield shields a section of the second side from the fluid; and wherein the shield channels fluid from a section of the second side and into the outlet; and Clause 20, the method of clause 15, wherein the inlet is a plurality of inlets; wherein the valve plunger further comprises an orifice between the plurality of inlets and the outlet wherein the orifice comprises at least one planar surface and at least one non-planar surface; wherein the shield shields a portion of the second side from the fluid; and wherein the shield channels fluid from a first section of the second side and a second section of the second side and into the outlet; wherein the shield is one of formed with the plunger, coupled to the plunger, and placed in a flow path under the plunger.

What is claimed is:

1. A valve assembly used to control fluid flow rate, the valve assembly comprising:
    a valve plunger configured to force fluid having a flow rate to flow between an inlet and an outlet in a flow path, the valve plunger having an actuator force applied to a first side of the valve plunger, and the fluid in fluid communication with a second side of the valve plunger, the valve plunger positioned within at least a portion of a flow path perpendicular to an orientation of the valve plunger;
    an orifice positioned between the inlet and the outlet, wherein the orifice comprises at least one planar surface and at least one concave surface, the concave surface defined within the portion of the flow path perpendicular to the orientation of the valve plunger,
    an actuator configured to apply the actuator force to the first side of the valve plunger, the actuator force being operable to move the valve plunger towards a tubular member forming part of the flow path; and
    a shield configured to reduce a destabilizing force that is applied by the fluid to the second side, wherein the shield is a cylindrical protuberance extending from the bottom of the plunger.

2. The valve assembly of claim 1, wherein the valve plunger further comprises a recessed section on the second side configured to receive the shield.

3. The valve assembly of claim 2, wherein the shield is one of coupled to, formed in, and suspended from underneath the valve plunger and extends a length into the outlet.

4. The valve assembly of claim 1, wherein the shield shields a section of the second side from the fluid.

5. The valve assembly of claim 1, wherein the shield channels fluid from a section of the second side and into the outlet.

6. The valve assembly of claim 1, wherein the inlet is a plurality of inlets; wherein the valve plunger further comprises the orifice between the plurality of inlets and the outlet; wherein the shield shields a portion of the second side from the fluid; and wherein the shield channels fluid from a first section of the second side and a second section of the second side and into the outlet; wherein the shield is one of formed with the plunger, coupled to the plunger, and placed in a flow path under the plunger.

7. A mass flow controller for controlling fluid flow rate, the mass flow controller comprising:
    an electronically controlled actuator, controllable in response to changes in a set flow rate for creating an actuator force;
    a valve assembly communicable coupled to the electronically controlled actuator and comprising a valve plunger, the valve plunger configured to force fluid having a flow rate to flow between an inlet and an outlet at least in part through a tubular member, the valve plunger having the actuator force applied to a first side of the valve plunger, and the fluid in fluid communication with a second side of the valve plunger, the valve plunger positioned within at least a portion of a flow path perpendicular to an orientation of the valve plunger;
    an orifice positioned between the inlet and the outlet, wherein the orifice comprises at least one planar surface and at least one concave surface, the concave surface defined within the portion of the flow path perpendicular to the orientation of the valve plunger; and
    a shield configured to reduce a destabilizing force that is applied to the second side, wherein the shield is a cylindrical protuberance extending from the bottom of the plunger.

8. The mass flow controller of claim 7, wherein the valve plunger further comprises a recessed section on the second side configured to receive the shield.

9. The mass flow controller of claim 7, wherein the shield is one of coupled to, formed in, and suspended from underneath the valve plunger and extends a length into the outlet.

10. The mass flow controller of claim 7, wherein the shield shields a section of the second side from the fluid.

11. The mass flow controller of claim 7, wherein the shield channels fluid from a section of the second side and into the outlet.

12. The mass flow controller of claim 7, wherein the inlet is a plurality of inlets; wherein the valve plunger further comprises the orifice between the plurality of inlets and the outlet; wherein the shield shields a portion of the second side from the fluid; and wherein the shield channels fluid from a first section of the second side and a second section of the second side and into the outlet; wherein the shield is one of formed with the plunger, coupled to the plunger, and placed in a flow path under the plunger.

13. A method for controlling fluid flow rate, the method comprising:
    creating an actuator force;
    applying the actuator force to a valve assembly;
    forcing fluid having a flow rate to flow between in a tubular member located between an inlet and an outlet using a valve plunger of the valve assembly, the valve plunger positioned within at least a portion of a flow path perpendicular to an orientation of the valve plunger, the valve assembly further including an orifice positioned between the inlet and the outlet, the orifice comprising at least one planar surface and at least one concave surface, the concave surface defined within the portion of the flow path perpendicular to the orientation of the valve plunger, wherein the forcing further comprises:

applying the actuator force to a first side of the valve plunger, the actuator force being a mechanical force applied to the first side;

applying the fluid with a second side of the valve plunger; and using a shield to reduce a destabilizing force that is applied to the second side, wherein the shield is a cylindrical protuberance extending from the bottom of the plunger.

14. The method of claim 13, wherein the valve plunger further comprises a recessed section on the second side configured to receive the shield.

15. The method of claim 13, wherein the shield is one of coupled to, formed in, and suspended from underneath the valve plunger and extends a length into the outlet.

16. The method of claim 13, wherein the shield shields a section of the second side from the fluid; and wherein the shield channels fluid from a section of the second side and into the outlet.

17. The method of claim 13, wherein the inlet is a plurality of inlets; wherein the valve plunger further comprises the orifice between the plurality of inlets and the outlet; wherein the shield shields a portion of the second side from the fluid; and wherein the shield channels fluid from a first section of the second side and a second section of the second side and into the outlet; wherein the shield is one of formed with the plunger, coupled to the plunger, and placed in a flow path under the plunger.

* * * * *